United States Patent
Backman et al.

(10) Patent No.: US 11,223,294 B2
(45) Date of Patent: Jan. 11, 2022

(54) POWER CONVERTER AND METHOD OF CONTROLLING A POWER CONVERTER

(71) Applicant: ELTEK AS, Drammen (NO)

(72) Inventors: Nils Backman, Drammen (NO); Roberto Rojas, Drammen (NO)

(73) Assignee: ELTEK AS, Drammen (NO)

( * ) Notice: Subject to any disclaimer, the term of this patent is extended or adjusted under 35 U.S.C. 154(b) by 41 days.

(21) Appl. No.: 16/724,108

(22) Filed: Dec. 20, 2019

(65) Prior Publication Data
US 2020/0204081 A1    Jun. 25, 2020

(30) Foreign Application Priority Data

Dec. 21, 2018 (EP) ..................................... 18215209

(51) Int. Cl.
| | |
|---|---|
| *H02M 5/458* | (2006.01) |
| *H02J 9/06* | (2006.01) |
| *H02M 3/158* | (2006.01) |
| *H02M 7/162* | (2006.01) |

(52) U.S. Cl.
CPC ............. *H02M 5/458* (2013.01); *H02J 9/062* (2013.01); *H02M 3/158* (2013.01); *H02M 7/162* (2013.01)

(58) Field of Classification Search
CPC ...... H02M 5/458; H02M 3/158; H02M 7/162; H02J 9/062
USPC ....................... 307/66, 64, 82, 81, 80, 43, 38
See application file for complete search history.

(56) References Cited

U.S. PATENT DOCUMENTS

| | | | |
|---|---|---|---|
| 6,400,586 B2 * | 6/2002 | Raddi | H02M 1/4208 363/37 |
| 10,004,123 B1 * | 6/2018 | Yang | H02H 9/042 |
| 2001/0045863 A1 * | 11/2001 | Pelly | H02M 1/12 327/552 |
| 2002/0109412 A1 * | 8/2002 | Johnson, Jr. | H02M 1/10 307/66 |

(Continued)

FOREIGN PATENT DOCUMENTS

JP    2010041744 A    2/2010

OTHER PUBLICATIONS

Extended European Search Report for EP 18215209.0.
(Continued)

*Primary Examiner* — Nguyen Tran
*Assistant Examiner* — Jagdeep S Dhillon
(74) *Attorney, Agent, or Firm* — J.C. Patents

(57) ABSTRACT

The present disclosure provides to a power converter including an AC input terminal (ACin), a neutral terminal (N), an AC output terminal (ACout), an AC/DC converter circuit (210) connected between the AC input terminal, a positive DC terminal (DCP), and a negative DC terminal (DCN), a DC capacitor (C15) connected between the positive DC terminal (DCP) and the negative DC terminal (DCN), a line frequency commutated neutral circuit (220) connected between the positive DC terminal (DCP), the negative DC terminal (DCN), and the neutral terminal (N), and a DC/AC converter circuit (230) connected between the positive DC terminal (DCP), the negative DC terminal (DCN), the AC output terminal (ACout), and the neutral terminal (N). The power converter further includes an auxiliary converter circuit (240) connected between the positive DC terminal (DCP), the negative DC terminal (DCN), and the neutral terminal (N).

18 Claims, 19 Drawing Sheets

(56) References Cited

U.S. PATENT DOCUMENTS

| | | | |
|---|---|---|---|
| 2005/0162137 A1* | 7/2005 | Tracy | H02M 7/53873 |
| | | | 323/217 |
| 2008/0061628 A1* | 3/2008 | Nielsen | H02J 9/062 |
| | | | 307/66 |
| 2011/0044077 A1* | 2/2011 | Nielsen | H02M 5/4585 |
| | | | 363/37 |
| 2015/0280602 A1 | 10/2015 | Ichihara | |
| 2015/0381070 A1 | 12/2015 | Backman | |
| 2016/0134210 A1* | 5/2016 | Bock | H01H 50/323 |
| | | | 318/739 |
| 2020/0295595 A1* | 9/2020 | Shigeta | H02J 9/062 |

OTHER PUBLICATIONS

"A study of the high performance single phase UPS", pesc'98. Record of the 29th annual IEEE power epectronics specialists conference. Fukuoka, May 18-21, 1998.

\* cited by examiner

POWER CONVERTER AND METHOD OF CONTROLLING A POWER CONVERTER

CROSS-REFERENCE TO RELATED APPLICATION

This application claims priority to European Patent Application No. 18215209.0, filed on Dec. 21, 2018, which is hereby incorporated by reference in its entirety.

TECHNICAL FIELD

The present disclosure relates to a power converter for converting an alternating current (AC) input voltage to an AC output voltage. The present disclosure also relates to a method for controlling such a power converter.

BACKGROUND

AC-UPSs (Alternating Current-Uninterruptable Power Supply) are used when there is need for reliable AC-supply to critical loads such as a telecom radio base station, or server supporting data-storage and data-transmission in a data/telecom network or lifesaving equipment in hospitals.

An AC-UPS needs at least three ports for routing the energy to the critical load. One port contains the connections to the public grid, which supplies an AC-input voltage between line and neutral, the second port contains connections to the AC-load, and the third port contains connections to a battery.

It is common in AC-UPS applications to form the AC-to-AC conversion by the use of an AC/direct current (DC) converter and a DC/AC converter. The AC/DC converter supplies energy to an intermediate DC-voltage, which serves as input voltage to a DC/AC converter and a bidirectional DC/DC converter. The intermediate DC-voltage connects to a battery via the regulated DC/DC converter. The DC/DC converter may charge the battery or may supply energy to the DC/AC converter from the battery in case of the AC-input voltage is not present.

The battery voltage and the connection of the battery cells can vary. An example of a typical battery voltage in telecom applications is −48V with plus terminal grounded. Other examples of typical industrial battery voltages are 110V, 220V, and 380V.

The operation of a single-phase AC and DC UPS module containing three converters, input AC/DC, output DC/AC and an isolated bidirectional DC/DC converter is described in the following section. It should be noted that there is a variety of single-phase UPS switching topologies. The "line frequency" is in the following equivalent to the frequency of the AC-voltage in the public grid. Typical line frequencies are 50 Hz or 60 Hz.

Some relevant prior art circuits and control methods are described in the following sections.

FIG. 1a shows an example of a prior art circuit 1, disclosed in "Analytical consideration on Power Loss in a Three-Arm-Type Uninterruptible Power Supply", Hirao et al, 1998 IEEE. Here it is shown that a full bridge-to-full bridge AC/AC converter can be simplified and replaced by a half bridge-to-half bridge AC/AC converter. This circuit includes three half-bridge sub-circuits or so-called "legs", which in FIG. 1a is denoted as dashed boxes 10, 20, 30.

The first half-bridge leg 10 is part of a PFC (Power Factor Correction) stage connecting the AC input to an intermediate DC voltage over a capacitor C15. This capacitor C15 and the positive and negative DC terminals DCP, DCN are shown in a dashed box 15.

The second half-bridge leg 20 is common for the first leg and the third leg and is referred to as the "neutral leg".

The third half-bridge leg 30 is an inverter, which is converting the intermediate DC-voltage to an AC output voltage, energizing a critical load. This prior art publication proposes a method for de-coupling AC-input from AC-output by switching the second leg 20, the neutral leg, with a high frequency PWM (Pulse Width Modulation) pattern.

It would however be desirable to switch the neutral leg at the line frequency. A neutral leg switching at the line frequency is hereafter called a "line frequency commutated neutral leg". The word "commutate" reflects the fact that the DC-link voltage needs to change sign, from positive to negative and vice versa at the line frequency so that the inverter stage can regulate the AC output voltage to have a sinusoidal shape with a positive and a negative half period. There are many good reasons for having a line frequency commutated neutral leg compared with a high frequency switched neutral leg. An advantage is that the high frequency switching losses are eliminated. Another advantage is that the common mode (CM) noise associated with the high frequency switching of the neutral leg is eliminated, resulting in smaller sized common mode filter components. Yet another advantage having a line frequency commutated neutral leg is the fact that it allows for using surge protection diodes. Yet another advantage is that a line frequency commutated neutral leg simplifies the use of interleaved topologies for the AC-input PFC, and AC-output inverter stage.

The serious drawback of a line frequency commutated neutral leg is that AC-input and AC-output are no longer de-coupled. Even a small displacement in phase or frequency between AC input and AC output voltages will introduce serious distortion of AC currents and output voltage. This is illustrated in FIG. 2, showing the case when the neutral leg is switched at the line frequency and synchronized to the line frequency so that the DC-link is supplying a positive voltage at the positive half-period of AC-output, and a negative voltage at the negative AC-output. FIG. 2 is illustrating the voltage between the AC output terminal ACout and the neutral terminal N of FIG. 1a. The voltage before the filter is the high frequency switched voltage measured between the node N30, and the neutral terminal N. This high frequency PWM controlled voltage is filtered to a sinusoidal shaped voltage, at the node, ACout. Hence, the voltages shown are the voltages before and after the low pass filter including the inductor L30 and the capacitor C30 of FIG. 1a. The encircled zero crossings contain a clearly visible distortion of the AC-output voltage caused by a small displacement of the line voltage to the line frequency switching of the neutral-leg.

A method to completely de-couple AC-input from AC-output is to re-place the line commutation leg with a three level intermediate DC voltage as shown in "Su et al.; A new topology for Single Phase UPS systems, IEEE 1997". Two capacitors in series support +/−400V so that the inverter stage can synthesize a sinusoidal 230VAC output voltage. Neutral line is common to AC-input and AC-output and connects to the mid-point of the two capacitors. The obvious drawback with this scheme is the need for two capacitors in series and the high blocking voltage capability requirement put on the power semiconductors.

In U.S. Pat. No. 6,314,007, it is described a multi-mode power converter incorporating balancer circuits. This converter is an attempt to overcome the drawback of the three-level intermediate DC voltage mentioned above. Neutral line is common to AC-input and AC-output and connects to the mid-point of the two capacitors. A balancer circuit is proposed to alternately charge and discharge the two series coupled capacitors, so that the sum of the voltages applied over each one of the two capacitors never exceed the voltage rating of the three switching legs. The obvious drawback of this solution is of course that the balancer circuit has to process reactive energy, in the charge/discharge process. In order to overcome this disadvantage and keep the amount of reactive energy low, a control method is proposed, to control the two DC-buses so that they follow the sinusoidal shape of input AC and output AC voltages combined with keeping the capacitance values low. This control scheme will however introduce another disadvantage, namely the loss of energy storage for hold-up, in case of sudden loss of AC input. This problem is overcome by turning the balancer circuit into an isolated converter connected to a DC energy source, which can be a battery. None of these disadvantages are present in this disclosure.

The paper "Space Vector Modulation for Single Phase On-Line Three-Leg UPS", Pinheiro et al, 2000 IEEE describes a method for de-coupling AC-input to AC-output by letting a least one of the three legs alternatively be switched at the line frequency using a modulation method based on space vector modulation theory.

A popular method for de-coupling output and input in a single-phase AC-UPS combines the line commutated with high frequency switching as described in U.S. Pat. No. 80,445,352, with the title Backup Power System. This method controls the neutral leg to switch with a PWM pattern in a short time period starting and ending just before and after the zero crossing of the AC-input and AC output. The neutral leg will act as line commutation switches during the remaining 80-90% of the line frequency period. This method allows for a limited phase shift between AC input and output without distorting the current and voltage waveforms. A disadvantage is that switching losses in the neutral leg remain, although during a shorter time interval. The creation of a large common mode noise source is another disadvantage due to the high frequency shifting of the reference of the intermediate DC. The following brief explanation of how this CM noise is created is supported by FIG. 1a. Consider the neutral leg in dashed box 20. It can be seen that the neutral leg is connected in parallel with the DC-link voltage between the positive node DCP, and the negative node DCN. Let us assume a DC-link voltage of 400V. The neutral leg switches are conducting in a complementary fashion. When conducting they can be approximated as a short circuit. One can then see that the DC-link voltage will be alternatively connected to the neutral conductor, N, so that either positive node, DCP, or the negative node, DCN, will be connected to neutral. The positive node DCP, will therefore be jumping between 0V and +400V compared to neutral, N, and the negative node, DCN, will be jumping between 0V and −400V to neutral because of this switching action. The neutral, N, is normally connected the safety earth, or safety ground. The switching action of the neutral leg will therefore introduce a high frequency disturbance to ground, a so-called common mode (CM) noise disturbance. The amplitude of this CM noise is equal to the DC-link voltage. If DC-link voltage is 400V, then the amplitude of the CM-noise source will 400V. The shape of the CM-noise will be a square wave. A square wave has a high frequency content with multiples of the switching frequency.

Having a common mode noise source like this introduces a number of disadvantages. One disadvantage is that a common mode filter need to be constructed to suppress the noise to levels below the limits of called for by mandatory EMC (Electro Magnetic Compatibility) regulations and standards required for selling and installing the product in different markets.

Another disadvantage of switching the neutral leg is that it prevents the use of surge protection diodes. Surge protection diodes are often used for bypassing surge currents resulting from overvoltage that may occur on the grid due to disturbances like lightning, switching of heavy loads, or similar. This type of surge protection diodes shall never be conducting in normal operation. However they are supposed to conduct when there is an overvoltage present at the AC-input, which is so large that the diodes will be forward biased. The condition for this to happen is that the surge voltage on AC-input needs to be higher than the DC-link voltage. The surge protection diodes will then provide a low resistive path from the AC-grid to the DC-link capacitors, thus bypassing the AC/DC converter and protecting the semiconductors from over-current and possible failure.

It is now referred to prior art in FIG. 1a. It should be noted that the switches, in the three switching circuits, S10a, S10b, S20a, S20b, S30a, S30b are all bi-directional with respect to current and uni-directional with respect to blocking voltage. The reason being, that these half bridge switching circuits are switching currents driven by inductances, meaning that the current driven by the inductive energy always needs a path, a path provided by an antiparallel diode in case of the active switch is commanded to be non-conductive. The anti-parallel diode makes the total arrangement uni-directional with respect to blocking voltage. It should also be noted that a silicon MOSFET (Metal-Oxide Semiconductor Field-Effect Transistor) usually contain an anti-parallel diode. Other types of power semiconductor switches may have to be combined with an external antiparallel, fast recovery diode. There is always a tradeoff between power semiconductors having low switching losses or low conduction losses. Power semiconductors exhibiting low switching losses have usually higher conduction losses due to the smaller die size and smaller capacitance. As an example, high power MOSFETs might not be suitable for high frequency switching in a half-bridge configuration due to their larger die size and thus relatively higher output capacitance. Suitable power semiconductors, for high frequency switching of half-bridge circuits are usually IGBTs (Insulated Gate Bipolar Transistor), Silicon Carbide, SiC FETs (Field Effect Transistor), or Gallium Nitride, GaN FETs. These components have all relatively small die size compared with an equally rated MOSFET.

The object of the present disclosure is to avoid the disadvantages above related to prior art. Hence, one object is to provide a single phase AC/AC converter with high efficiency while providing decoupling between the AC input and AC output.

SUMMARY

It is an object of some embodiments of the inventive subject matter to provide a power converter, and more particularly to a power converter for converting an AC input voltage to an AC output voltage, a method for controlling a power converter and a method for controlling an uninterruptable power supply to avoid the disadvantages above related to prior art. Hence, one object is to provide a single phase power converter providing decoupling between the AC input and AC output with low common mode noise levels, high efficiency and high reliability.

The present disclosure relates to a power converter including an AC input terminal, a neutral terminal, an AC output terminal, an AC/DC converter circuit connected between the AC input terminal, a positive DC terminal and a negative DC terminal, a DC capacitor connected between the positive DC terminal and the negative DC terminal, a line frequency commutated neutral circuit connected between the positive DC terminal, the negative DC terminal and the neutral terminal, and a DC/AC converter circuit connected between the positive DC terminal, the negative DC terminal, the AC output terminal and the neutral terminal, wherein the power converter further includes an auxiliary converter circuit connected between the positive DC terminal, the negative DC terminal and the neutral terminal.

In one aspect, the auxiliary converter circuit includes a first auxiliary switching device and a second auxiliary switching device in a half-bridge configuration.

In one aspect, the auxiliary converter circuit further includes an auxiliary capacitor and an auxiliary inductor, wherein the first auxiliary switching device is connected between the positive DC terminal and an auxiliary circuit node, the second auxiliary switching device is connected between the auxiliary circuit node and the negative DC terminal, the auxiliary capacitor is connected between the negative DC terminal and the neutral terminal, and the auxiliary inductor is connected between the auxiliary circuit node and the neutral terminal.

In one aspect, the power converter further includes a control circuit configured to provide control signals to the first auxiliary switching device and the second auxiliary switching device of the auxiliary converter circuit.

In one aspect, the control signals include pulse width modulation signals.

In one aspect, the auxiliary converter circuit is configured to decouple the AC input terminal and the AC output terminal during a period around zero crossings of an AC line voltage supplied to the AC input terminal and an AC output voltage supplied to the AC output terminal.

In one aspect, the period around the zero crossings has a duration of 1-2 milliseconds.

In one aspect, the control circuit is configured to control the first auxiliary switch device and the second auxiliary switch device by the steps of defining first, second, third, fourth, fifth and sixth time intervals for the AC line voltage period, wherein zero crossing of the AC line voltage is defined at the start of the first and fourth time intervals, controlling, by means of the control circuit, the first auxiliary switching devices to perform switching with a first duty cycle and the second auxiliary switching device to perform switching with a second duty cycle during the first, third, fourth and sixth time intervals, and controlling, by means of the control circuit, the first auxiliary switching device and the second auxiliary switching device to be turned off during the second and fifth time intervals, wherein a sum of the first duty cycle and the second duty cycle is less than or equal to 1.

In one aspect, at least one of the AC/DC converter circuit and/or the DC/AC converter circuit includes an interleaved type of converter circuit.

In one aspect, the AC/DC converter circuit includes a first switching device connected between the positive DC terminal and a AC/DC circuit node, a second switching device connected between the AC/DC circuit node and the negative DC terminal, and an input inductor connected between the AC/DC circuit node and the AC input terminal.

In one aspect, the AC/DC converter circuit includes a first switching device connected between the positive DC terminal and a first AC/DC circuit node, a second switching device connected between the first AC/DC circuit node and the negative DC terminal, a third switching device connected between the positive DC terminal and a second AC/DC circuit node, a fourth switching device connected between the second AC/DC circuit node and the negative DC terminal, a first input inductor connected between the first AC/DC circuit node and the AC input terminal, and a second input inductor connected between the second AC/DC circuit node and the AC input terminal.

In one aspect, the AC/DC converter circuit includes a first diode device connected between the positive DC terminal and a first AC/DC circuit node, a second diode device connected between the first AC/DC circuit node and the negative DC terminal, a third diode device connected between the positive DC terminal and a second AC/DC circuit node, a fourth diode device connected between the second AC/DC circuit node and the negative DC terminal, a first input inductor connected between the first AC/DC circuit node and the AC input terminal, a second input inductor connected between the second AC/DC circuit node and the AC input terminal, a first switching device connected between the first AC/DC circuit node and the neutral terminal, and a second switching device connected between the second AC/DC circuit node and the neutral terminal.

In one aspect, the DC/AC converter circuit includes a first switching device connected between the positive DC terminal and a DC/AC circuit node, a second switching device connected between the DC/AC circuit node and the negative DC terminal, a output inductor connected between the DC/AC circuit node and the AC output terminal, and an output capacitor connected between the AC output terminal and the neutral terminal.

In one aspect, the DC/AC converter circuit includes a first switching device connected between the positive DC terminal and a first DC/AC circuit node, a second switching device connected between the first DC/AC circuit node and the negative DC terminal, a third switching device connected between the positive DC terminal and a second DC/AC circuit node, a fourth switching device connected between the second DC/AC circuit node and the negative DC terminal, a first output inductor connected between the first DC/AC circuit node and the AC output terminal, a second output inductor connected between the second DC/AC circuit node and the AC output terminal, and an output capacitor connected between the AC output terminal and the neutral terminal.

In one aspect, the power converter further includes a surge protection circuit including a first diode having an anode connected to the AC input terminal and a cathode connected to the positive DC terminal, and a second diode having an anode connected to the negative DC terminal and a cathode connected to the AC input terminal and to the neutral terminal.

In one aspect, the line frequency commutated neutral circuit includes a first switching device and a second switching device in a half-bridge configuration.

In one aspect, the first switching device of the line frequency commutated neutral circuit is connected between the positive DC terminal and a line frequency commutated neutral circuit node, the second switching device of the line frequency commutated neutral circuit is connected between the line frequency commutated neutral circuit node and the negative DC terminal, and the line frequency commutated neutral circuit node is connected to the neutral terminal.

The present disclosure also relates to a method for controlling a power converter including an AC input terminal, a neutral terminal, an AC output terminal, a positive DC terminal, a negative DC terminal, an AC/DC converter circuit connected between the AC input terminal, the positive DC terminal and the negative DC terminal, a line frequency commutated neutral circuit connected between the positive DC terminal, the negative DC terminal and the neutral terminal, a DC/AC converter circuit connected between the positive DC terminal, the negative DC terminal, the AC output terminal, and the neutral terminal, an auxiliary converter circuit including a first switching device and a second switching device in a half-bridge configuration and connected between the positive DC terminal, the negative DC terminal, and the neutral terminal, and a control circuit electrically coupled with the first switching device and the second switching device of the auxiliary converter circuit, wherein the method includes the steps of defining first, second, third, fourth, fifth and sixth time intervals for an AC line voltage period, where zero crossing of the AC line voltage is defined at the start of the first and fourth time intervals; controlling, by means of the control circuit, the first auxiliary switching device to perform switching with a first duty cycle and the second auxiliary switching device to perform switching with a second duty cycle during the first, third, fourth and sixth time intervals; controlling, by means of the control circuit, the first auxiliary switching device and the second auxiliary switching device to be turned off during the second and fifth time intervals, wherein a sum of the first duty cycle and the second duty cycle is less than or equal to 1.

In one aspect, where the line frequency commutated neutral circuit includes a first switching device and a second switching device in a half-bridge configuration, the method further includes the steps of controlling, by means of the control circuit, the first switching device and the second switching device of the line frequency commutated neutral circuit to be turned off during the first, third, fourth and sixth time intervals; and controlling, by means of the control circuit, the first switching device and the second switching device of the line frequency commutated neutral circuit to perform switching during the second and fifth time intervals.

The present disclosure also relates to a uninterruptable power supply, including a power converter of one of the above aspects, and a rechargeable battery connected to the positive DC terminal and the negative DC terminal.

The auxiliary converter circuit may be active only during a short time period around the zero crossings of AC-input and AC-output providing an effective de-coupling of AC input to AC output. This short time period typically lasts 1-2 milliseconds. During this short time period, only a small portion of the total energy is handled. Hence, most of the energy will still be handled by the line commutated neutral switching devices, providing a linear, smooth commutation of intermediate DC-voltage so that either the positive or the negative DC terminal could be connected to the neutral terminal by the switching device operating at the line frequency.

Moreover, as the high frequency switching of the neutral leg in prior art may be eliminated by the use of the auxiliary line commutation circuit, it is possible to use switching components with larger die size in the neutral leg and thus reduced conduction losses may be achieved. In addition, some embodiments may further eliminate the need for a large common mode filter.

With larger die size follows the ability to sustain overcurrent caused by surge voltages. A surge voltage is here defined as an overvoltage caused by lightning or heavy load switching, causing a transient with duration shorter than a line frequency period. A surge voltage will drive a surge current into the module and may cause damage if the components are not dimensioned to withstand the surge. This may increase the reliability of the circuit compared with prior art circuits.

The above surge protection diodes can be used to let the surge current bypass the high frequency switched PFC stage switches and return through the neutral switches. Surge protection diodes and line frequency commutated neutral switches will increase the ability to withstand such transient surge voltages.

BRIEF DESCRIPTION OF DRAWINGS

Other objectives, features, and advantages of the present disclosure will be further understood from the further details disclosed by the embodiments of the present disclosure wherein there are shown and described preferred embodiments of the invention, simply by way of illustration of modes best suited to carry out the invention, and the above contents of the present disclosure will become more readily apparent to those ordinarily skilled in the art after reviewing the following detailed description and accompanying drawings, in which.

DETAILED DESCRIPTION OF EMBODIMENTS

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present disclosure will be described in detail with reference to the accompanying drawings. Note that members having the same function are denoted by the same reference symbols throughout all drawings for describing the embodiments, and the repetitive description thereof will be omitted.

It is to be understood that other embodiment may be utilized, and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and variations thereof herein are used broadly and encompass direct and indirect connections and couplings.

Figure 1A:
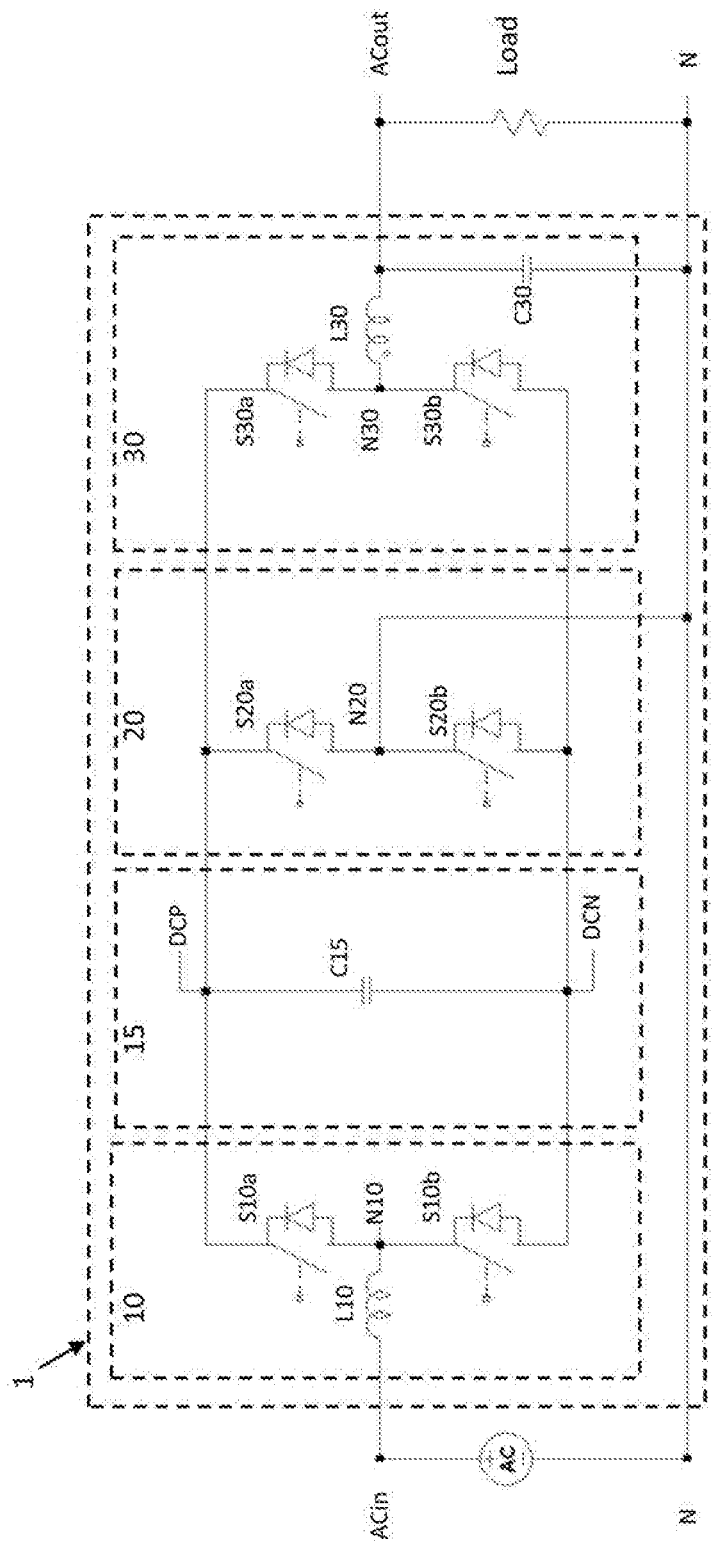
FIG. 1a illustrates a prior art power converter.

It is now referred to the prior art power converter 1 shown in FIG. 1a. The main purpose of the power converter 1 is to convert an AC input voltage to an AC output voltage and is therefore often referred to as an AC/AC converter. It should be noted that only the electrical power circuitry is shown in FIG. 1a, in addition, there will be sensors for measuring voltages and/or currents of the converter, there will be a control circuit for controlling the switches of the AC/AC converter based on sensed voltages and/or currents etc. Moreover, such AC/AC converters will typically include electrical fans, heat sinks and etc. for cooling purposes.

As partially described in the introduction above, the AC/AC converter includes three main terminals: an AC input terminal ACin, a neutral terminal N and an AC output terminal ACout. These three terminals are available for connection to an AC input source and an AC load. In FIG. 1a, the AC source is connected between the AC input terminal ACin and the neutral terminal N, while the load is connected between the AC output terminal ACout and the neutral terminal N.

In addition, there are two additional terminals, a positive DC terminal DCP and a negative DC terminal DCN. In some applications, these positive and negative DC terminals DCP, DCN may be considered as internal terminals inside the AC/AC converter itself. A rechargeable battery may or may not be connected between these terminals DCP, DCN.

Figure 1B:
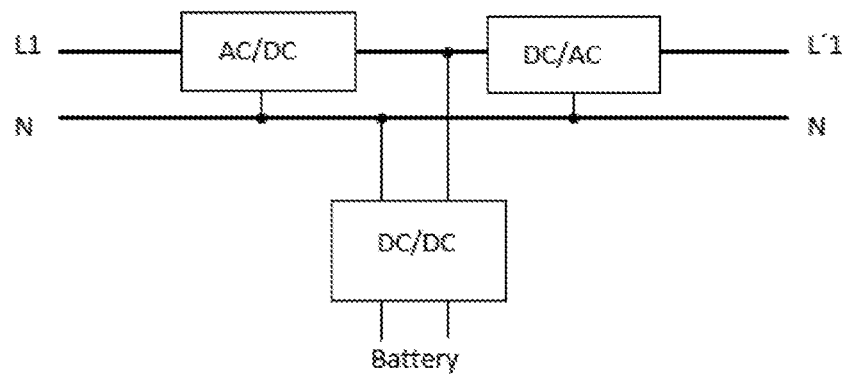
FIG. 1b illustrates a prior art single phase AC-UPS.

However, when the AC/AC converter 1 is used as an AC-UPS (UPS: Uninterruptible Power Supply), these two terminals DCP, DCN may be available for connection to a battery. The connection to a battery can be made directly or via a galvanic isolated or non-isolated DC/DC converter as shown in FIG. 1b.

In FIG. 1a, it is shown that the AC/AC converter 1 includes four dashed boxes, which will be referred to as an AC/DC converter circuit 10, an energy storage circuit 15, a line frequency commutated neutral circuit 20 and a DC/AC converter circuit 30.

The AC/DC converter circuit 10 is connected between the AC input terminal and a positive DC terminal DCP and a negative DC terminal DCN and includes two switching devices S10a, S10b in a half-bridge configuration. The first switching device S10a is connected between the positive DC terminal DCP and an AC/DC circuit node N10. The second switching device S10b is connected between the AC/DC circuit node N10 and the negative DC terminal DCN. The AC/DC converter circuit 10 further includes an input inductor L10 connected between the AC/DC circuit node N10 and the AC input terminal ACin. The first and second switching devices S10a, S10b may be referred to as first and second AC/DC switching devices S10a, S10b.

The energy storage circuit 15 includes a DC capacitor C15 connected between the positive DC terminal DCP and the negative DC terminal DCN.

The line frequency commutated neutral circuit 20 is connected between the positive DC terminal DCP, the negative DC terminal DCN and the neutral terminal N and includes two switching devices S20a, S20b in a half-bridge configuration. These switching devices may be referred to as neutral switching devices The first neutral switching device S20a is connected between the positive DC terminal DCP and a line frequency commutated neutral circuit node N20. The second neutral switching device S20b is connected between the line frequencies commutated neutral circuit node N20 and the negative DC terminal DCN. The line frequency commutated neutral circuit node N20 is connected to the neutral terminal N. As described in the introduction above, these neutral switching devices are bi-directional with respect to current and uni-directional with respect to blocking voltage.

The DC/AC converter circuit 30 is connected between the positive DC terminal DCP, the negative DC terminal DCN, the AC output terminal ACout and the neutral terminal N. It includes two switching devices S30a, S30b in a half-bridge configuration. These switching devices may be referred to as DC/AC switching devices. The first DC/AC switching device S30a is connected between the positive DC terminal DCP and a DC/AC circuit node N30. The second DC/AC switching device S30b is connected between the DC/AC circuit node N30 and the negative DC terminal DCN. The DC/AC converter circuit 30 further includes an output inductor L30 connected between the DC/AC circuit node N30 and the AC output terminal ACout and an output capacitor C30 connected between the AC output terminal ACout and the neutral terminal N. As described in the introduction above, these switching devices are bi-directional with respect to current and uni-directional with respect to blocking voltage. As mentioned above, the AC/AC converter 1 further includes a control circuit for controlling the AC/DC switching devices S10a, S10b, the switching devices S20a, S20b and the DC/AC switching devices S30a, S30b.

First Embodiment

The first embodiment of the present disclosure will now be described with reference to FIG. 3. The embodiment discloses a power converter 2 for converting an AC input voltage to an AC output voltage of the embodiment including an AC input terminal ACin, a neutral terminal N, an AC output terminal ACout, an AC/DC converter circuit 210 connected between the AC input terminal ACin, a positive DC terminal DCP, and a negative DC terminal DCN, an energy storage circuit 215, a line frequency commutated neutral circuit 220, a DC/AC converter circuit 230, and an auxiliary converter circuit 240 connected between the positive DC terminal DCP, the negative DC terminal DCN and the neutral terminal N The auxiliary converter circuit 240 includes a first switching device S40a and a second switching device S40b in a half-bridge configuration. The first switching device S40a and the second switching device S40b may be referred to as auxiliary switching devices S40a, S40b.

The first auxiliary switching device S40a is connected between the positive DC terminal DCP and an auxiliary circuit node N40. The second auxiliary switching device S40b is connected between the auxiliary circuit node N40 and the negative DC terminal DCN.

The first auxiliary switching device S40a and the second auxiliary switching device S40b are bi-directional with respect to current and uni-directional with respect to blocking voltage.

The auxiliary converter circuit 240 further includes an auxiliary capacitor C40 connected between the negative DC terminal and the neutral terminal N and an auxiliary inductor L40 connected between the auxiliary circuit node N40 and the neutral terminal N.

Figure 4:
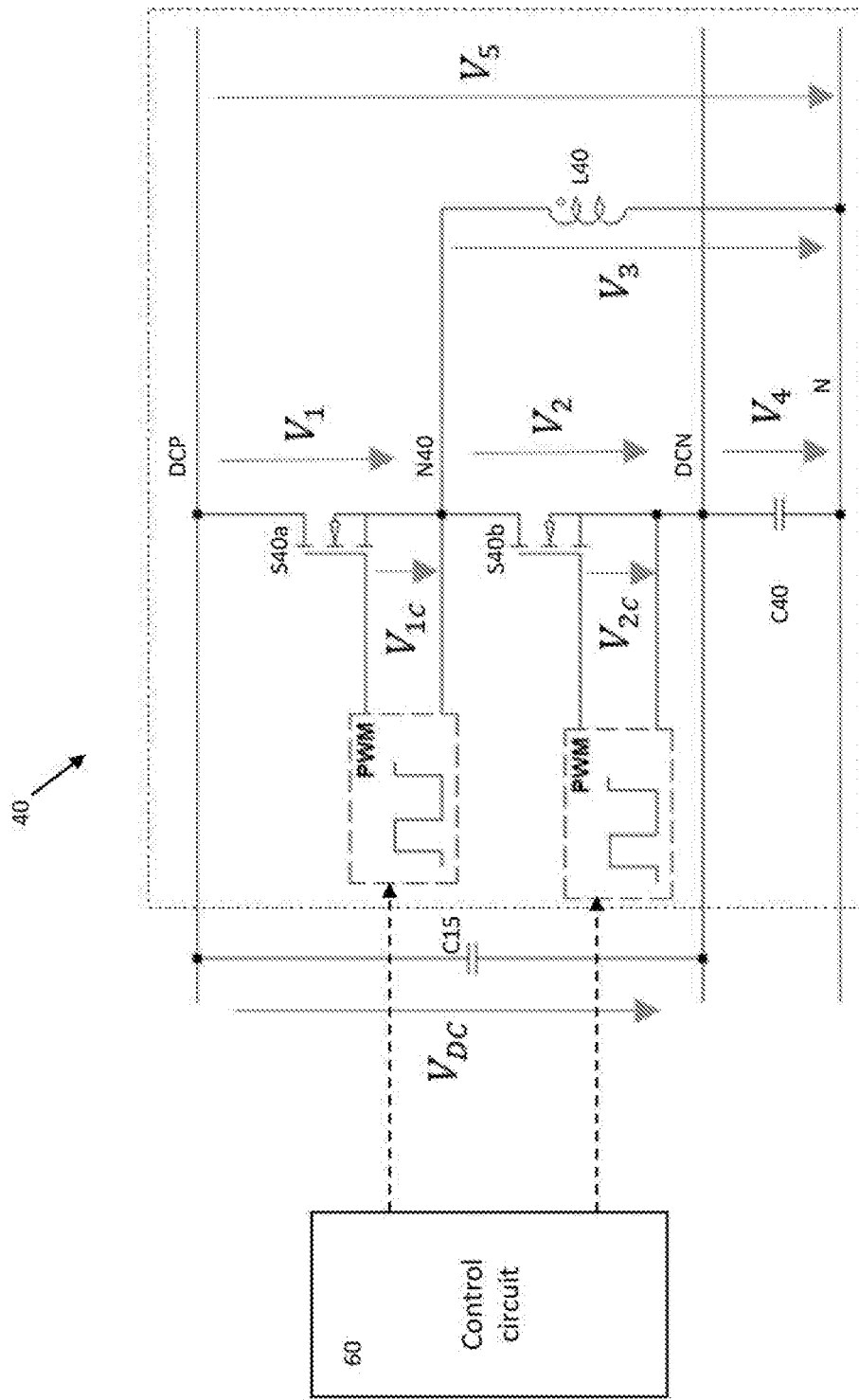
FIG. 4 illustrates details of the auxiliary sub-circuit of FIG. 3.

In FIG. 4, it is shown that a control circuit 60 is connected to control terminals of the auxiliary switching devices S40a, S40b. It is also shown that the control circuit 60 provides PWM (PWM: Pulse Width Modulation) control signals to the auxiliary switching devices S40a, S40b.

In FIG. 4, a first control voltage V1c is provided by the control circuit 60 to the control terminal of the first auxiliary switching device S40a. A second control voltage V2c is provided by the control circuit 60 to the control terminal of the second auxiliary switching device S40b.

A first voltage V1 denotes the voltage between the positive DC terminal DCN and the auxiliary node N40, a second voltage V2 denotes the voltage between the auxiliary node N40 and the negative DC terminal DCN, a third voltage V3 denotes the voltage between the auxiliary node N40 and the neutral terminal N, a fourth voltage V4 denotes the voltage between the negative DC terminal DCN and the neutral terminal N and a fifth voltage V5 denotes the voltage between the positive DC terminal DCP and the neutral terminal N.

The DC voltage between the positive DC terminal DCP and the negative DC terminal DCN is denoted $V_{DC}$.

The control method of the auxiliary switching devices S40a, S40b will be described in detail with reference to FIGS. 5 and 6.

Figure 5:
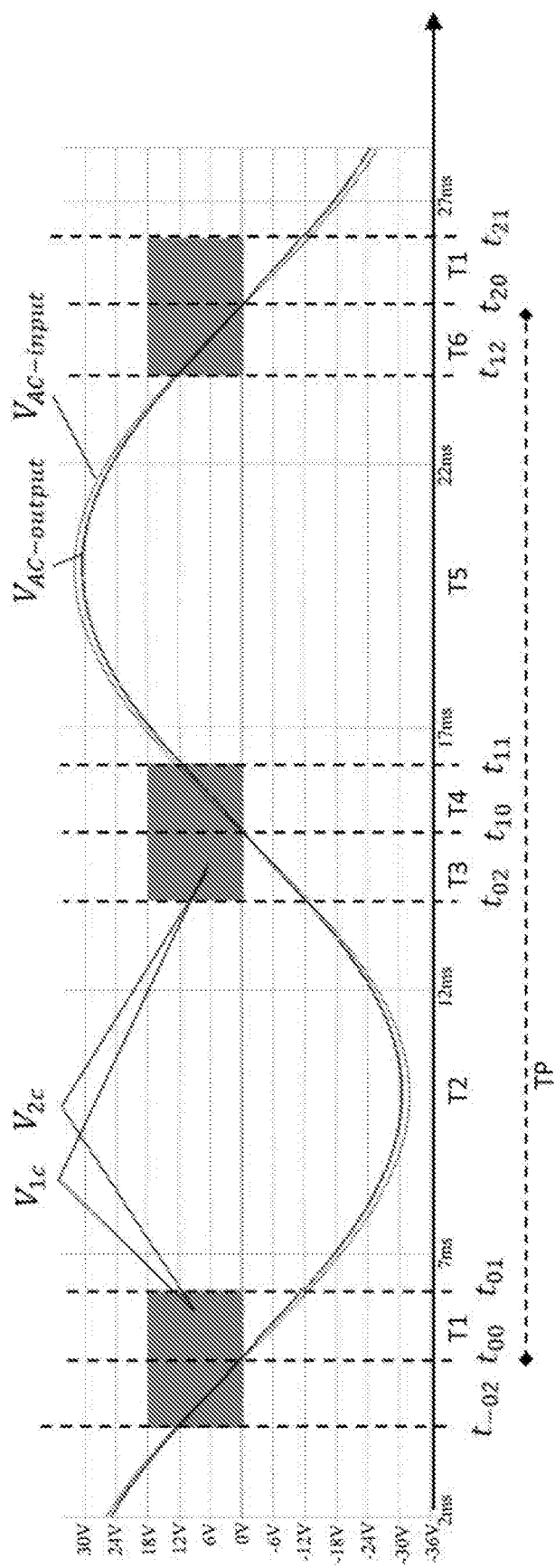
FIG. 5 illustrates voltages of FIGS. 3 and 4 during different time intervals.

In FIG. 5, the AC line voltage (the input voltage, or the voltage between the AC input terminal ACin and the neutral terminal) is indicated as Vac-input, while the output voltage between the AC output terminal ACout and the neutral terminal N is indicated as Vac-output. The period of this AC line voltage is shown as period TP from time t00 to time t20.

Figure 6:
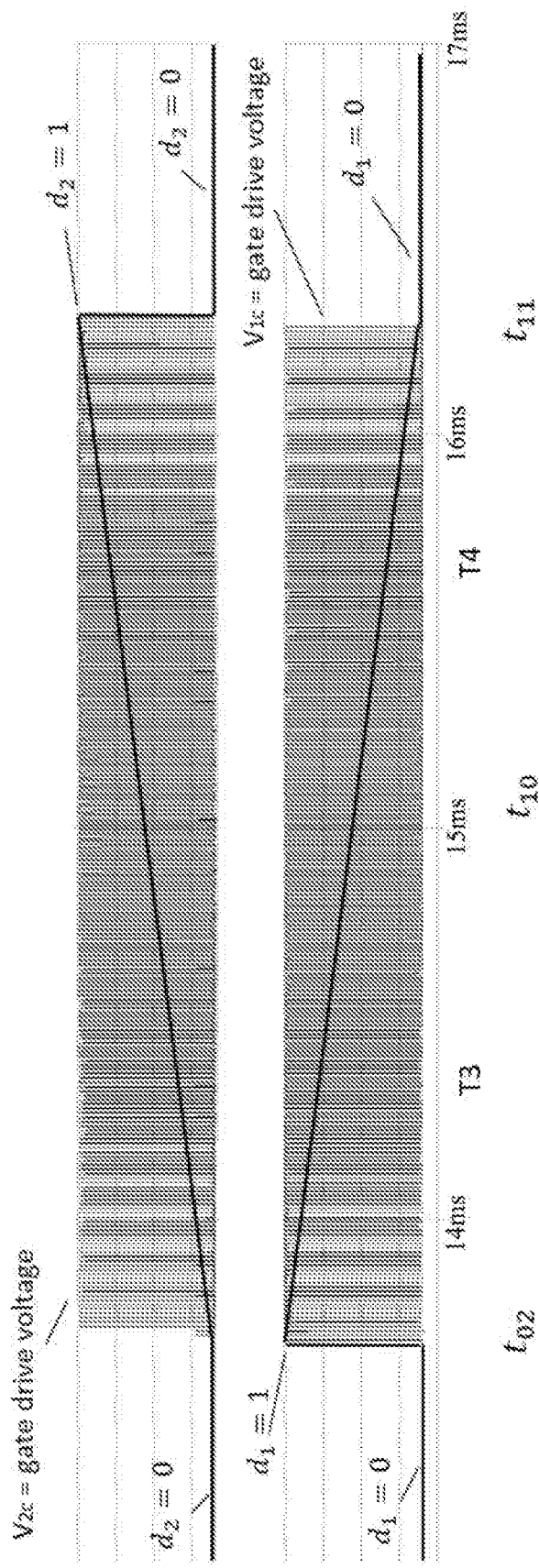
FIG. 6 illustrates the duty cycles for the control signals for the auxiliary sub-circuit.

In FIGS. 4, 5 and 6, it is shown that the control circuit applies the control signal $V_{1C}$ to the upper switch, S40a, and a control signal $V_{2C}$ to the lower switch, S40b of the auxiliary circuit 240. The control signals may have a fixed frequency with a varying duty cycle, d.

Duty cycle, d, is an average value of "on-time", defined as the relation between on-time, $t_p$ and high frequency switch period, $T_s$.

$$d = \frac{t_p}{T_s} = t_p f_s \qquad \text{eq. 1}$$

The concept of duty cycle can be understood as follows: d=1 indicates that $t_p=T_s$, so the switch is then always ON in a conducting state. d=0 indicates that $t_p=0$, so the switch is then always OFF in a blocking state. d=0.25 indicates that $t_p=0.25\ T_s$, so the switch is then ON in a conducting state, in average of 25% of the time. The duty cycle, d, will be used in the following to estimate the average value of the voltage over the switches.

The switching frequency, $f_s$, is in the order of several kilo Hertz, thus much higher than the AC line frequency (which typically is 50 or 60 Hz). The auxiliary circuit is suitable for even higher switching frequency. The auxiliary circuit may be using a switching frequency in the range of twice-to-ten times the switching frequency of the switches in the AC/DC converter circuit 210 and in the DC/AC converter circuit 230. Higher switching frequency will make it possible to choose smaller size and weight of the auxiliary components. This means in practice that a typical choice for the switching frequency of the auxiliary switches would fall in the range of 50 kilo Hertz-to-1 Mega Hertz. Typical numbers for the relation between the AC input/output currents and the auxiliary inductor current are 30 Arms compared to 0.6 Arms, respectively. It is obvious for anyone skilled in the art of designing high frequency inductors that the physical size, and the cost for the auxiliary inductor, L40, will be negligibly small in comparison to the AC input, L10, and output, L30, filter inductors. Similarly, typical numbers for the intermediate DC capacitors, C15, compared to the auxiliary capacitor, C40, are in the range of 600 uF to 1.5 uF.

The auxiliary switches are blocking when the control signal is zero, and conducting when the control signal is high.

The auxiliary switches would be conducting and blocking in a complementary manner.

Both auxiliary switches can also be in the blocking stage simultaneously.

With reference to FIG. 5 is the line period divided in 6 unique time intervals intervl T1 between $t_{00}$-$t_{01}$, interval T2 between $t_{01}$-$t_{02}$, interval T3 between $t_{02}$-$t_{10}$, interval T4 between $t_{10}$-$t_{11}$, interval T5 between $t_{11}$-$t_{12}$, and interval T6 between $t_{12}$-$t_{20}$. These intervals repeat every line frequency period. In one embodiment of the present disclosure, the time intervals T1, T2, T3, T4, T5, T6 are consecutive time intervals.

$t_{00}$-$t_{20}$ is equal to the above line period TP.

$t_{00}$-$t_{10}$ is equal to the first half period with predominantly negative AC-voltage.

$t_{10}t_{20}$ is equal to the second half period with predominantly positive AC-voltage.

$t_{00}$, $t_{10}$, and $t_{20}$ mark the expected zero crossings of AC-input and AC-output voltages.

$t_{-02}$-$t_{01}$, $t_{02}$-$t_{11}$, and $t_{12}$-$t_{21}$ are short time intervals which includes the expected zero crossings of AC-input and AC-output voltages. The auxiliary switches are switching with varying duty cycle during these intervals. The switches of the line frequency commutated neutral circuit 220 are both in a blocking state during these intervals.

$t_{o1}$-$t_{o2}$, and $t_{11}$-$t_{12}$ are longer periods. The auxiliary switches are not switching during these two intervals. The switches of the line frequency commutated neutral circuit 220 are now conducting and blocking in a complementary manner. The first neutral switch S20a, connected between the node "DCP" and the node "N20", is conducting during the time interval $t_{o1}$-$t_{o2}$. The second neutral switch S20b, connected between the node "N20" and node "DCN", is conducting during the time interval $t_{11}$-$t_{12}$.

Going back to the time intervals $t_{-o2}$-$t_{o1}$, $t_{o2}$-$t_{11}$, and $t_{12}$-$t_{21}$. The auxiliary switches are switching with varying duty cycle during these intervals.

The duty cycle changes from 1-to-0 for one switch while the other switch is controlled by a duty cycle changing from 0-to-1.

The duty cycle for the upper switch, S40a, is named $d_1$ and the duty cycle for the lower switch, S40b, is named $d_2$. The sum of the two duty cycles will at any instance in time be close to one, eq. 2. The auxiliary switches are connected in a half bridge configuration. In one embodiment of the present disclosure, this means that they would never conduct simultaneously to prevent a short circuit of the intermediate DC-voltage. A short "dead time" could to be introduced, while neither one of the switches conduct. The dead time could be long enough to guarantee a margin for delays in imperfect signaling and drive circuitry. The dead time, typical value would be in the range of 50-500 ns, is in practice very short compared with the switching frequency period, that it can be neglected when discussing the duty cycle control of the auxiliary circuit in the following, wherein a sum of the first duty cycle $d_1$ and the second duty cycle $d_2$ is less than or equal to 1.

$$d_1 + d_2 \lesssim 1 \qquad \text{eq. 2}$$

FIG. 6 shows the preferred Pulse Width Modulated, PWM, control of the duty cycles for the control signals $V_{1c}$ and $V_{2c}$. FIG. 6 illustrates how duty cycle $d_1$ and $d_2$ are varying just before, and just after, and during the time interval $t_{o2}$-$t_{11}$. The switches are ON, in a conducting state when the control signals are logical high, meaning $\gtrsim$12V. The duty cycle $d_1$ is representing the average time when the control signal $V_{1c}$ is high and consequently the average time when switch S40a is ON. The duty cycle $d_2$ is representing the average time when the control signal $V_{2c}$ is high and consequently the average time when switch S40b is ON.

FIG. 6 shows that the switches are in the OFF state before $t_{o2}$ and after $t_{11}$, in other words, $d_1$ and $d_2$ are both equal to zero. At $t_{o2}$ is $d_1$ set to 1, but is linearly decreased to 0 during the time interval $t_{o2}$-$t_{11}$. On the other hand, $d_2$ linearly increased from 0 to 1 during the time interval $t_{o2}$-$t_{11}$.

$d_1$ and $d_2$ are varied in a similar fashion during the time intervals $t_{-o2}$-$t_{o1}$ and $t_{12}$-$t_{21}$: At $t_{-o2}$ is $d_1$ equal to 0 and is from that value linearly increased to 1 during the time interval $t_{-o2}$-$t_{o1}$. $d_2$ is linearly decreased from 1 to 0 during the time same interval $t_{-o2}$-$t_{o1}$. At $t_{12}$ is $d_1$ start with the value 0, and is linearly increased to 1 during the time interval $t_{12}$-$t_{21}$. And $d_2$ is linearly decreased from 1 to 0 during the time same interval $t_{12}$-$t_{21}$.

The auxiliary half bridge switches S40a, S40b are connected between the nodes DCP and DCN. The intermediate voltage $V_{DC}$ is generated between the nodes DCP and DCN. The intermediate DC voltage could be higher than the peak value of AC-input and AC-output. For a single phase 230VAC UPS is $V_{DC} \approx$ 400V a suitable choice.

The voltage over the upper switch, with drain connected to node DCP and source to node "N40" is named $V_1$.

The voltage over the lower switch connected with drain to node N40 and source to node DCN is named $V_2$.

It is obvious from FIG. 4 that the sum of voltages $V_1$ and $V_2$ is equal to $V_{DC}$.

$$V_1 + V_2 = V_{DC} \qquad \text{eq. 3}$$

Re-arranging eq. 3:

$$V_2 = V_{DC} - V_1 \qquad \text{eq. 4}$$

With reference to FIG. 4; $V_4$ and $V_5$ are the voltage potential between nodes DCN to N and nodes "DCP" to "N" respectively.

By inspection of FIG. 4:

$$V_4 = V_3 - V_2 \qquad \text{eq. 5}$$

Inserting eq. 4 in eq. 5:

$$V_4 = V_3 - (V_{DC} - V_1) \qquad \text{eq. 6}$$

By inspection of FIG. 4:

$$V_5 = V_4 + V_{DC} \qquad \text{eq. 7}$$

The average "on time" of the auxiliary switches is controlled by the duty cycle. We can therefore use the duty cycle for estimating the average value of $V_1$ and $V_2$:

$$\text{AVG}(V_1) \cong (1 - d_1) V_{DC} \qquad \text{eq. 8}$$

$$\text{AVG}(V_2) \cong (1 - d_2) V_{DC} \qquad \text{eq. 9}$$

The average value of $V_3$ must be equal to zero, as inductor cannot block DC-voltage.

$$\text{AVG}(V_3) = 0 \qquad \text{eq. 10}$$

Averaging eq. 6 and combining eq. 10:

$$V_4 = \text{AVG}(V_1) - V_{DC} \qquad \text{eq. 11}$$

Inserting eq. 8 in eq. 11

$$V_4 \cong (1 - d_1) V_{DC} - V_{DC} \qquad \text{eq. 12}$$

By averaging and combining eq. 7 with eq. 12

$$V_5 \cong (1 - d_1) V_{DC} \qquad \text{eq. 13}$$

By varying duty cycle $d_1$ from 1-to-0 in eq. 12 and eq. 13

$$\left. \begin{array}{l} V_4 = \{d_1 = 1\} = -V_{DC} \\ V_4 = \{d_1 = 0\} = 0 \end{array} \right\} \qquad \text{eq. 12-1}$$

$$\left. \begin{array}{l} V_5 = \{d_1 = 1\} = 0 \\ V_5 = \{d_1 = 0\} = V_{DC} \end{array} \right\} \qquad \text{eq. 13-1}$$

It is now referred to FIG. 4, The equations 12, 12-1 and 13, 13-1 illustrate how the DC voltage between the positive DC terminal DCP and the negative DC terminal DCN, denoted $V_{DC}$, is controlled to gradually commutate, from having the negative terminal DCN connected to the neutral terminal, to have the positive terminal DCP connected to the neutral terminal and vice versa. Note that the voltages $V_4$ and $V_5$ are equivalent to the voltage at the nodes DCP and DCN measured with respect to the neutral node N.

In other words; the control circuit 60 is commanding a duty cycle, $d_1$, to the control signal, $V_{1c}$, and a duty cycle, $d_2$, to the control signal, $V_{2c}$. By doing so, the effect on the voltage $V_5$ between the positive node DCP and the neutral, node N, is described by equations 12, 12-1. Likewise, the effect on the voltage $V_4$ between the negative node DCN and the neutral, node N, is described by equations 13, 13-1.

Figure 7:
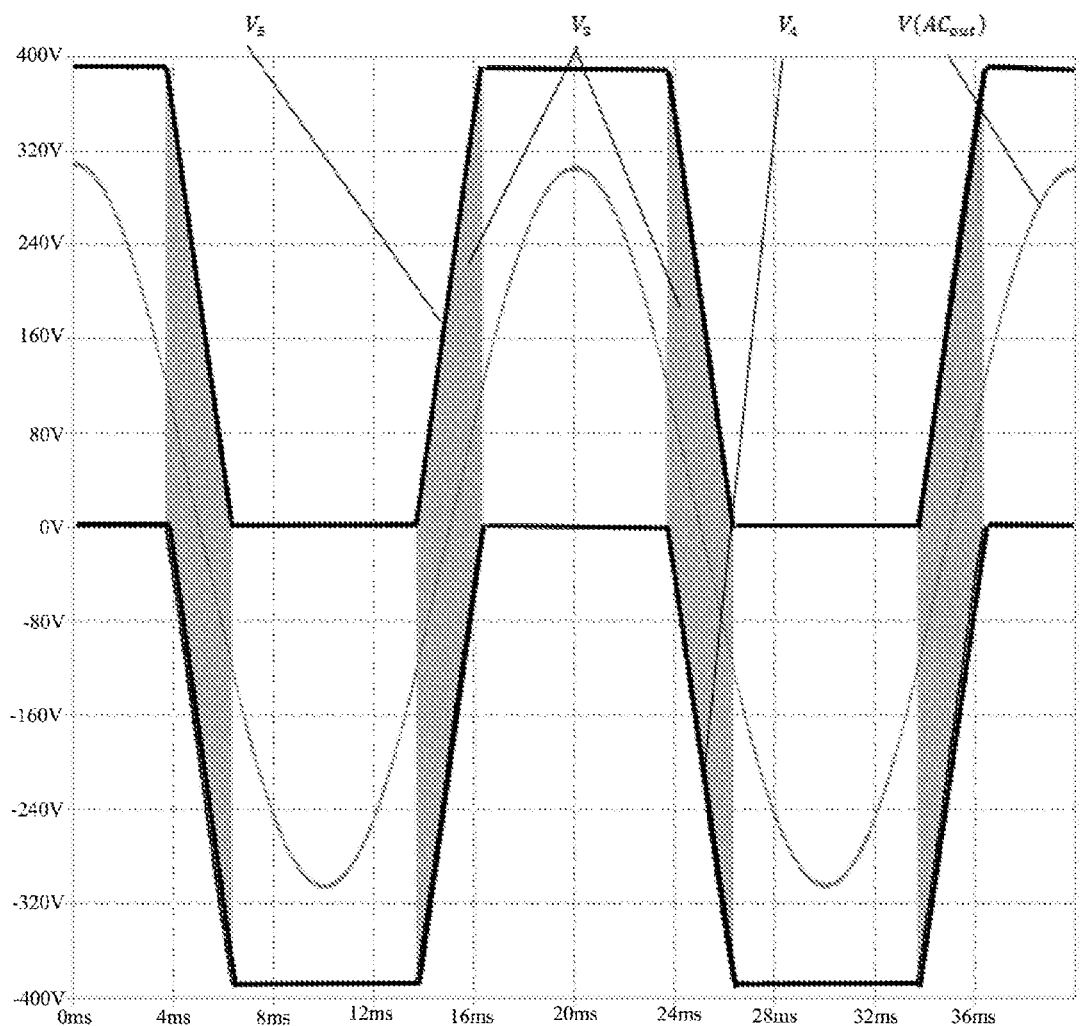
FIG. 7 illustrates the resulting voltages V2, V3, V4 of FIG. 4.

The effect on $V_4$ and $V_5$ as defined in equations 12-1 and 13-1 when varying duty cycle $d_1$ and $d_2$ linearly from 1-to-0, and 0-to-1 is shown graphically in FIG. 7. $V_3$, $V_4$ and $V_5$ are measured with the neutral, node N, as reference. $V_3$ is the voltage measured at the midpoint of auxiliary switches, node N40. $V_4$ is the voltage over the auxiliary capacitor, C40. $V_5$ is the sum of the voltages over DC-link capacitor, C15, and the auxiliary capacitor C40. Going back to FIG. 7, $V_3$ is illustrated by the grey area, because the node N40 is switched with a high frequency PWM pattern, while the before mentioned duty cycles $d_1$ and $d_2$ are controlled to change linearly from 1-to-0, and 0-to-1. The auxiliary circuit's low pass filter includes the filter inductor L40 and the filter capacitor C40, is effectively filtering the switching frequency measured in node N40, so that the voltages $V_4$ and $V_5$ exhibit very little switching frequency ripple. As is illustrated in FIG. 7 by solid black lines, the voltages $V_4$ and $V_5$ exhibit a smoth transition, without any high frequency ripple, so that $V_4$ is smoothly changing between −400V and 0V and $V_5$ is smoothly changing between 0V and +400V. Both positive and negative voltage is available during the transition time so that there is a room for having a limited phase shift of AC output with respect to the line frequency, and this may decouple AC input from AC output and thus avoid any distortion of AC output.

Second Embodiment

An alternative embodiment of the present disclosure will now be described with reference to FIG. 8. The embodiment discloses a power converter 3 converting an AC input voltage to an AC output voltage here includes the energy storage circuit 215, the line frequency commutated neutral circuit 220 and the auxiliary converter circuit 240. In this embodiment, the AC/DC converter circuit 210 and the DC/AC converter circuit 230 are an interleaved type of converter circuit.

Figure 3:
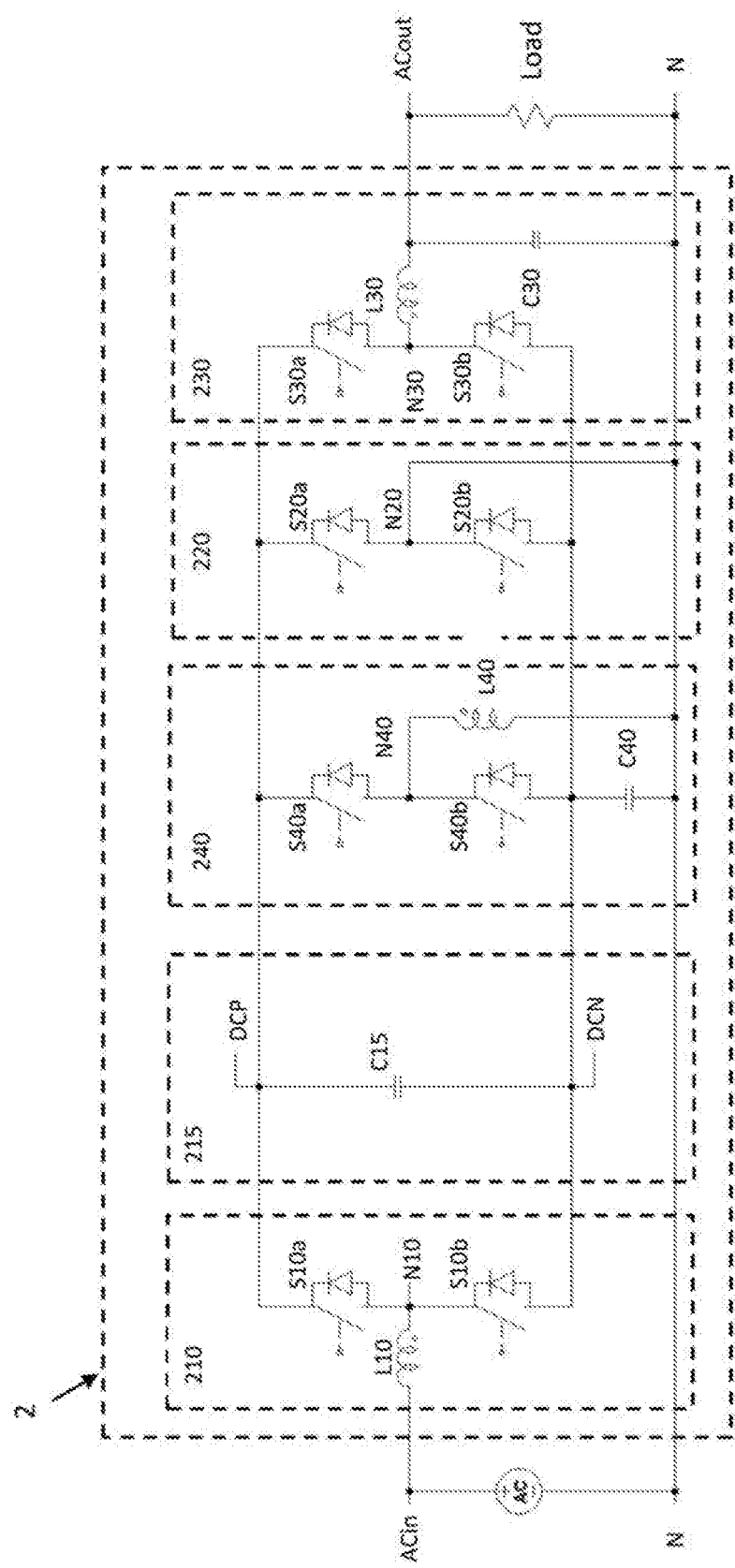
FIG. 3 illustrates a preferred embodiment of an power converter according to the present disclosure.
Figure 8:
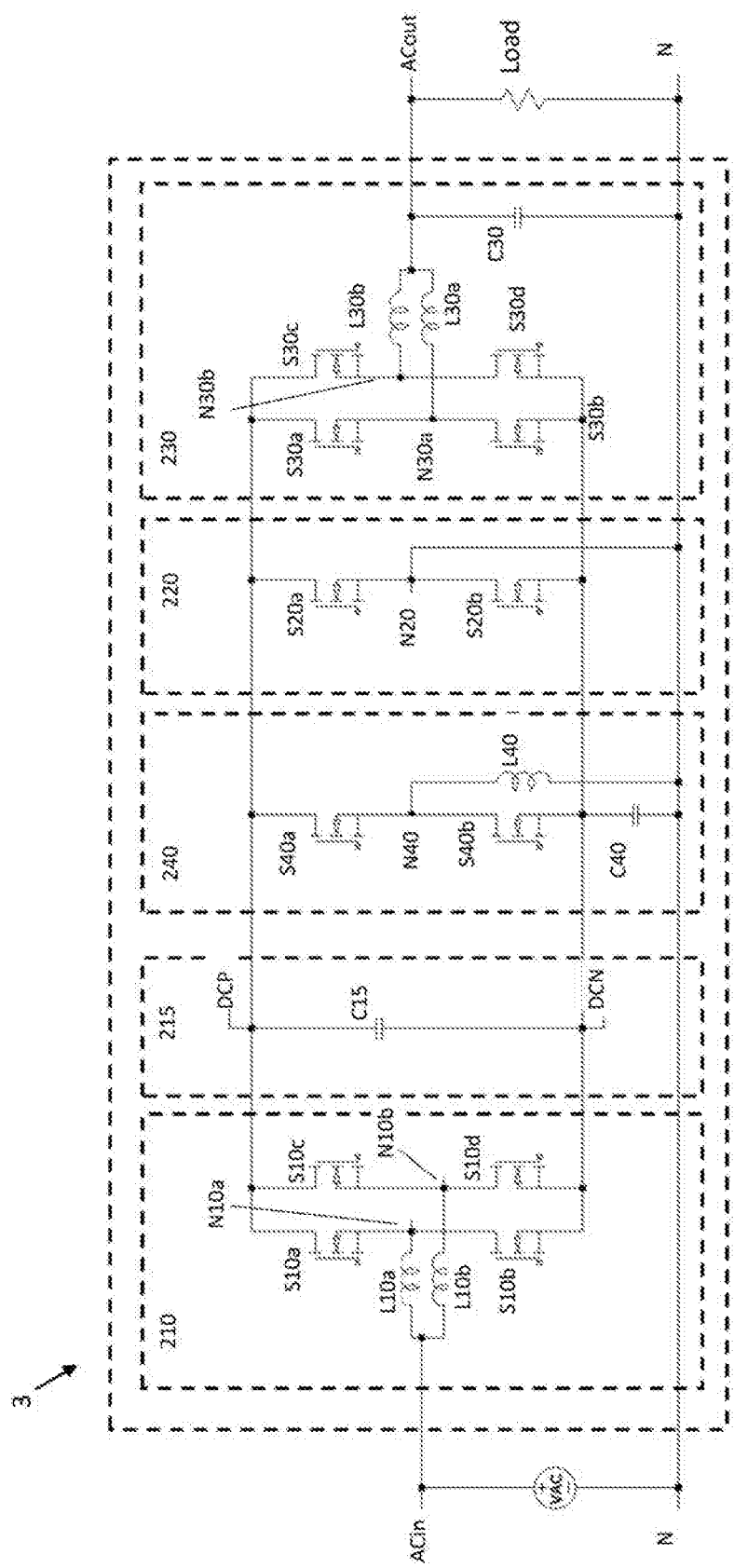
FIG. 8 illustrates an alternative embodiment to FIG. 3, where the AC/DC converter and the DC/AC converter are an interleaved type of converter.

It should be noted that the AC/DC converter circuit 210 can be of an interleaved type as in FIG. 8 while the DC/AC converter circuit 230 is of the type of FIG. 3. It is also possible that the AC/DC converter circuit 210 can be of the type in FIG. 3 while the DC/AC converter circuit 230 is of interleaved type of FIG. 8.

In FIG. 8, it is shown that the AC/DC converter circuit 210 includes a first switching device S10a, second switching device S10b, a third switching device S10c and a fourth switching device S10d. The first switching device S10a is connected between the positive DC terminal DCP and a first AC/DC circuit node N10a. The second switching device S10b is connected between the first AC/DC circuit node N10a and the negative DC terminal DCN. The third switching device S10c is connected between the positive DC terminal DCP and a second AC/DC circuit node N10b. The fourth switching device S10d is connected between the second AC/DC circuit node N10b and the negative DC terminal DCN.

In addition, the AC/DC converter circuit 210 includes a first input inductor L10a connected between the first AC/DC circuit node N10a and the AC input terminal ACin and a second input inductor L10b connected between the second AC/DC circuit node N10b and the AC input terminal ACin.

It is further shown in FIG. 8 that the DC/AC converter circuit 230 includes a first switching device S30a, a second switching device S30b, a third switching device S30c and a fourth switching device S30d. The first switching device S30a is connected between the positive DC terminal DCP and a first DC/AC circuit node N30a. The second switching device S30b is connected between the first DC/AC circuit node N30a and the negative DC terminal DCN. The third switching device S30c is connected between the positive DC terminal DCP and a second DC/AC circuit node N30b. The fourth switching device S30d connected between the second DC/AC circuit node N30b and the negative DC terminal DCN.

In addition, the DC/AC converter circuit 230 includes a first output inductor L30a connected between the first DC/AC circuit node N30a and the AC output terminal ACout, a second output inductor L30b connected between the second DC/AC circuit node N30b and the AC output terminal ACout and an output capacitor C30 connected between the AC output terminal ACout and the neutral terminal N.

The auxiliary circuit 240 is in the present embodiment controlled as described in the first embodiment.

The different type of power switches in different positions can be summarized as follows. The AC/DC converter circuit 210 and the DC/AC converter circuit 230 contain switches suitable for high frequency switching of the entire load current. The neutral line frequency commutated half bridge leg 20 contains switches suitable for conducting the entire load current and over-currents caused by surge currents. The auxiliary neutral commutation circuit 240 contains switches suitable for high frequency switching.

IGBTs are typically used for high frequency power switching in half-bridge configurations in the AC/DC converter circuit 210 and the DC/AC converter circuit 230. Wide bandgap devices such as Silicon Carbide and Gallium Arsenide power semiconductors are also suitable for high power, high frequency switching.

IGBTs and wide bandgap devices are also suitable for use in the auxiliary neutral commutation circuit 240.

MOSFETs are a good choice for conducting high currents in the line frequency commutated neutral leg 20.

As in the embodiments above, the switching devices are bi-directional with respect to current and uni-directional with respect to blocking voltage.

It should be noted that the present disclosure is not limited to specific types of switching devices at specific locations. As semi-conductor development is in progress, future semi-conductors of many types may show properties suitable for use in the above embodiments.

Figure 9:
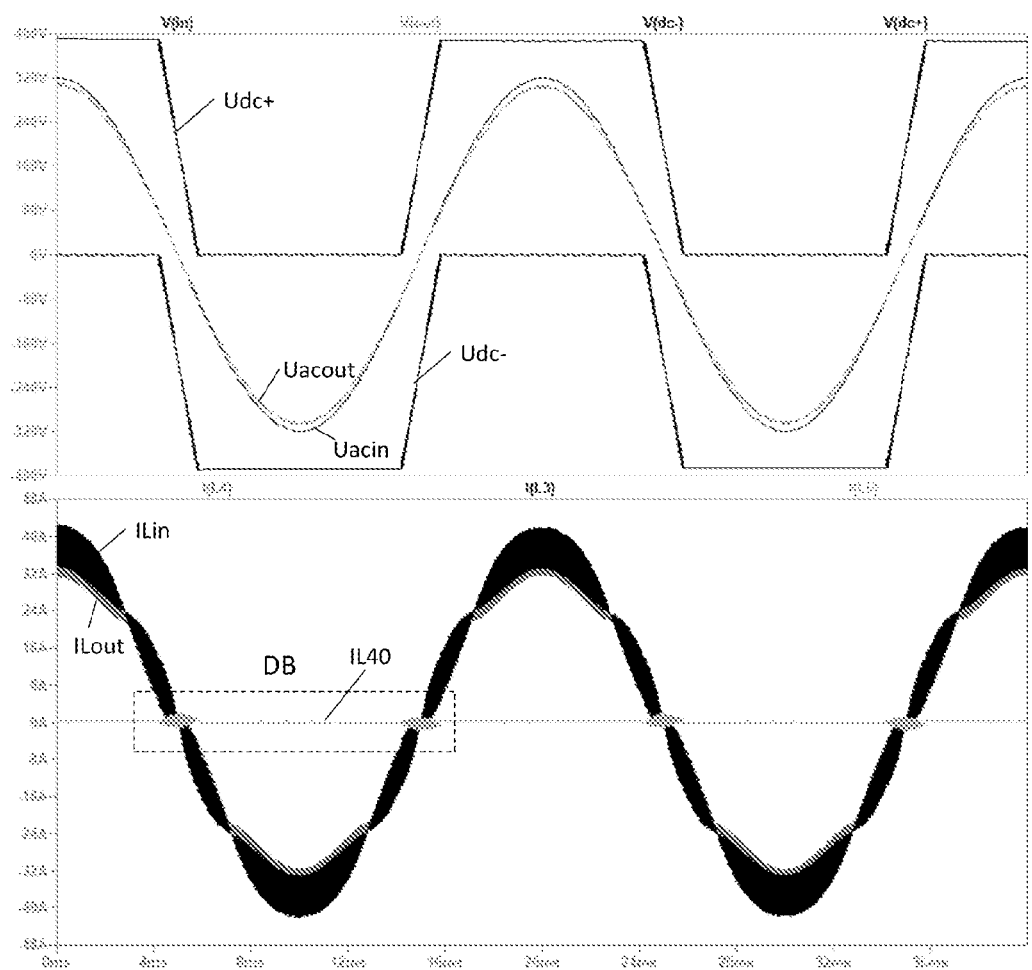
FIG. 9 illustrates input and output voltage, the potential of the positive and negative intermediate DC terminals, and the sum of input and sum of output inductor currents, and the inductor current of the auxiliary sub-circuit of FIG. 8.
Figure 10:
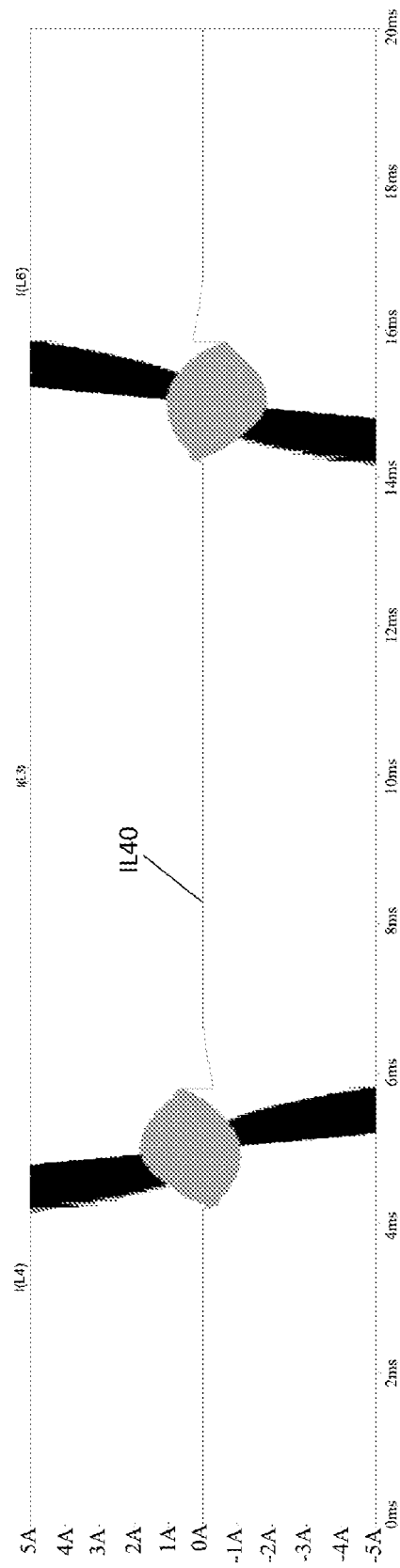
FIG. 10 illustrates an enlarged view of the dashed box DB of FIG. 9.

In FIG. 9 it shown voltages and currents measured in the circuit shown in FIG. 8. Upper diagram is showing voltages, and the lower diagram currents. The AC input voltage Uacin and AC output voltage Uacout have sinusoidal wave shapes, they are in phase, and approximately equal in amplitude. The effect of the auxiliary neutral commutation circuit 240 on the intermediate DC voltage is illustrated by the graphs showing the positive DC node potential Udc+ and the negative DC node potential Udc− with respect to the neutral node N. The auxiliary neutral commutation circuit 240 is controlling the line transition of the positive node between 0V to 400V, and the negative node from −400V and 0V. The lower diagram is showing three currents; the input current ILin is the interleaved sum of the current through first and second input inductors L10a, L10b, the output current ILout is the interleaved sum of the first and second output inductors, and the auxiliary inductor current IL40 through the auxiliary inductor L40. The auxiliary inductor current IL40 is zero except for time during which the linear transition of intermediate DC voltages takes place. The auxiliary inductor current IL40 is small compared with the input and output currents ILin and ILout. The root mean square value of the auxiliary inductor is typically 1-5% of the root mean square (RMS) value of the nominal output and input current. The box DB is enlarged in FIG. 10.

Third Embodiment

An alternative embodiment of the present disclosure will now be described. This embodiment is identical to the second embodiment of FIG. 8 with one exception—in FIG. 8, the first and second inductors L10a and L10b of the AC/DC converter circuit 210 and the first and second inductors L30a and L30b of the DC/AC converter circuit 230 are independent components, i.e. they are magnetically independent of each other, while in this third embodiment, the first and second inductors L10a, L10b of the AC/DC converter circuit 210 are magnetically connected to each other and the first and second inductors L30a, L30b of the DC/AC converter circuit 230 are magnetically connected to each other. Hence, in this embodiment, the inductors L10a, L10b include windings wounded around a common core and the inductors L30a, L30b include windings wounded around a common core.

The auxiliary circuit 240 is in the present embodiment controlled as described in the first embodiment.

Fourth Embodiment

Figure 11:
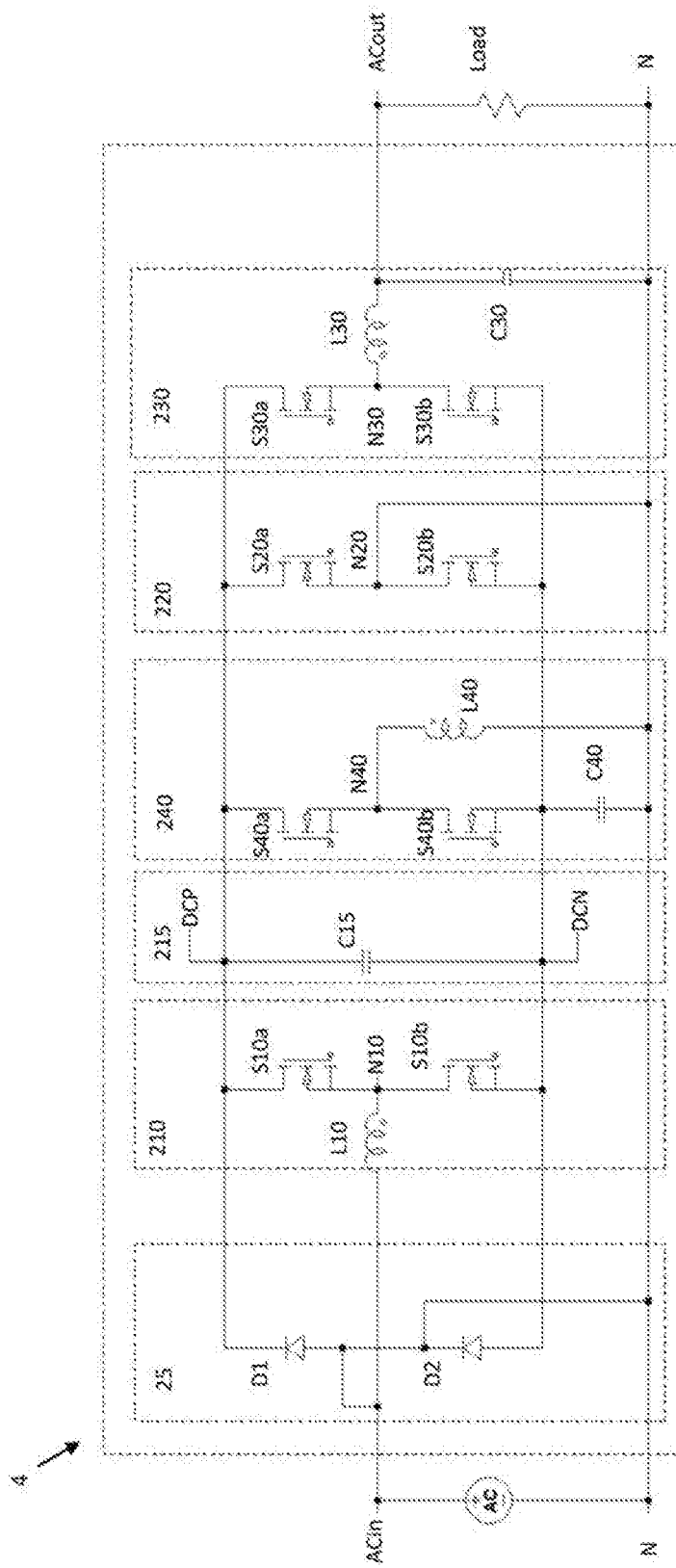
FIG. 11 illustrates an alternative embodiment to FIG. 3 with an additional surge protection circuit.

An alternative embodiment of the present disclosure will now be described with reference to FIG. 11. The power converter 4 here corresponds to the embodiment of FIG. 3, with the AC/DC converter circuit 210, energy storage circuit 215, the auxiliary converter circuit 240, the line frequency commutated neutral circuit 2 20 and the DC/AC converter circuit 230.

Figure 12:
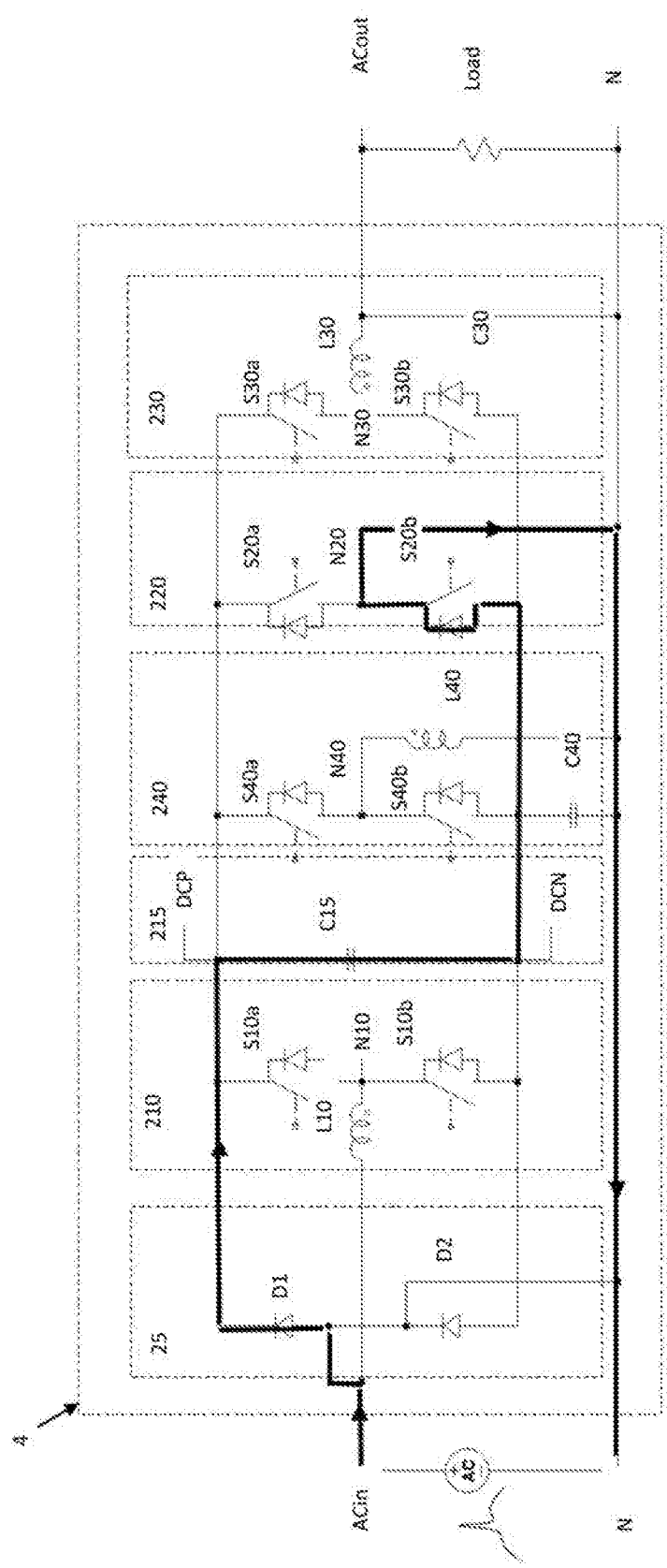
FIG. 12 illustrates how a surge current will propagate through the converter of FIG. 12.

In addition, the AC/AC converter 1 of FIG. 12 includes a surge protection circuit 25. The surge protection circuit 25 includes a first diode D1 having its anode connected to the AC input terminal ACin and its cathode connected to the positive DC terminal DCN and a second diode D2 having its anode connected to the negative DC terminal DCN and its cathode connected to the AC input terminal ACin and to the neutral terminal N.

It should also be noted that in the present embodiment, the switching devices S20a, S20b of the line frequency commutated neutral circuit 220 are of type which may withstand surges, typically a MOSFET or an IGBT.

It is now referred to FIG. 12. Here, a positive surge voltage is arriving at the AC input terminal ACin. The surge voltage will create a surge current. Such a surge current will propagate through the first diode D1, the capacitor C15 and the second switching device S20b. In a corresponding manner, a negative surge current will propagate through the second diode D2, the capacitor C15 and the first switching device S20a.

According to this embodiment, the switching devices of the circuits 210, 240 and 230 are protected from input surges.

Figure 13:
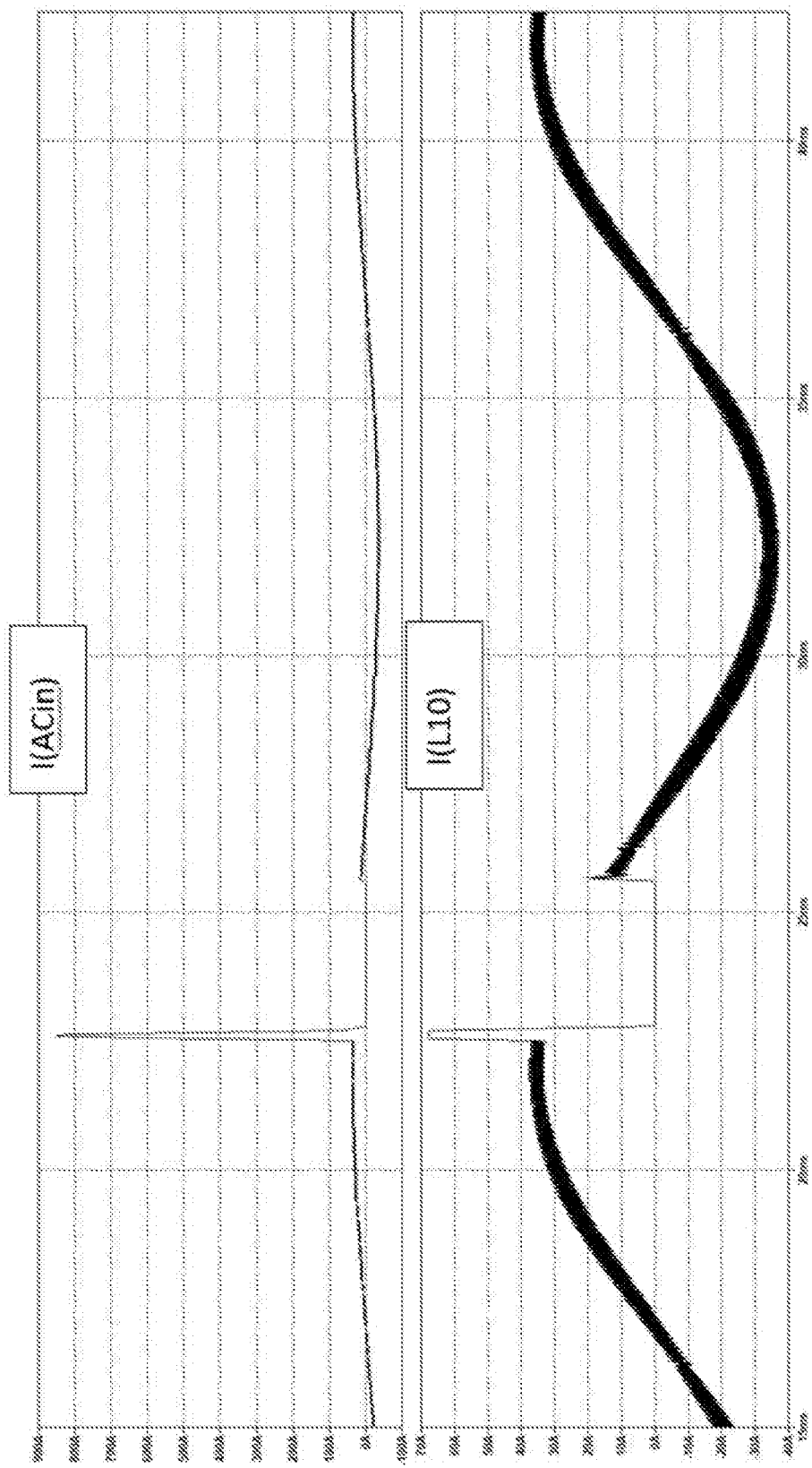
FIG. 13 illustrates an input current surge and the corresponding current through inductor L10 of FIG. 12.

It is now referred to FIG. 13. FIG. 13 is displaying the shape of the surge current which propagation shown in FIG. 12. Note that the current is peaking at a level >800 A. The shape of the current I(L10) through the input inductor L10 is shown below. Note that this current I(L10) has a peak at a level which is considerably less than the peak of the surge current (approximately 67 A). This level is low enough to allow for detecting and command a short period of safe turn-off of the switches in the input AC/DC, 10, as is illustrated by showing how the current in the AC-input inductor, I(L10) goes to zero during 2-3 milliseconds.

As in the embodiments above, the switching devices are bi-directional with respect to current and uni-directional with respect to blocking voltage.

Fifth Embodiment

Figure 14:
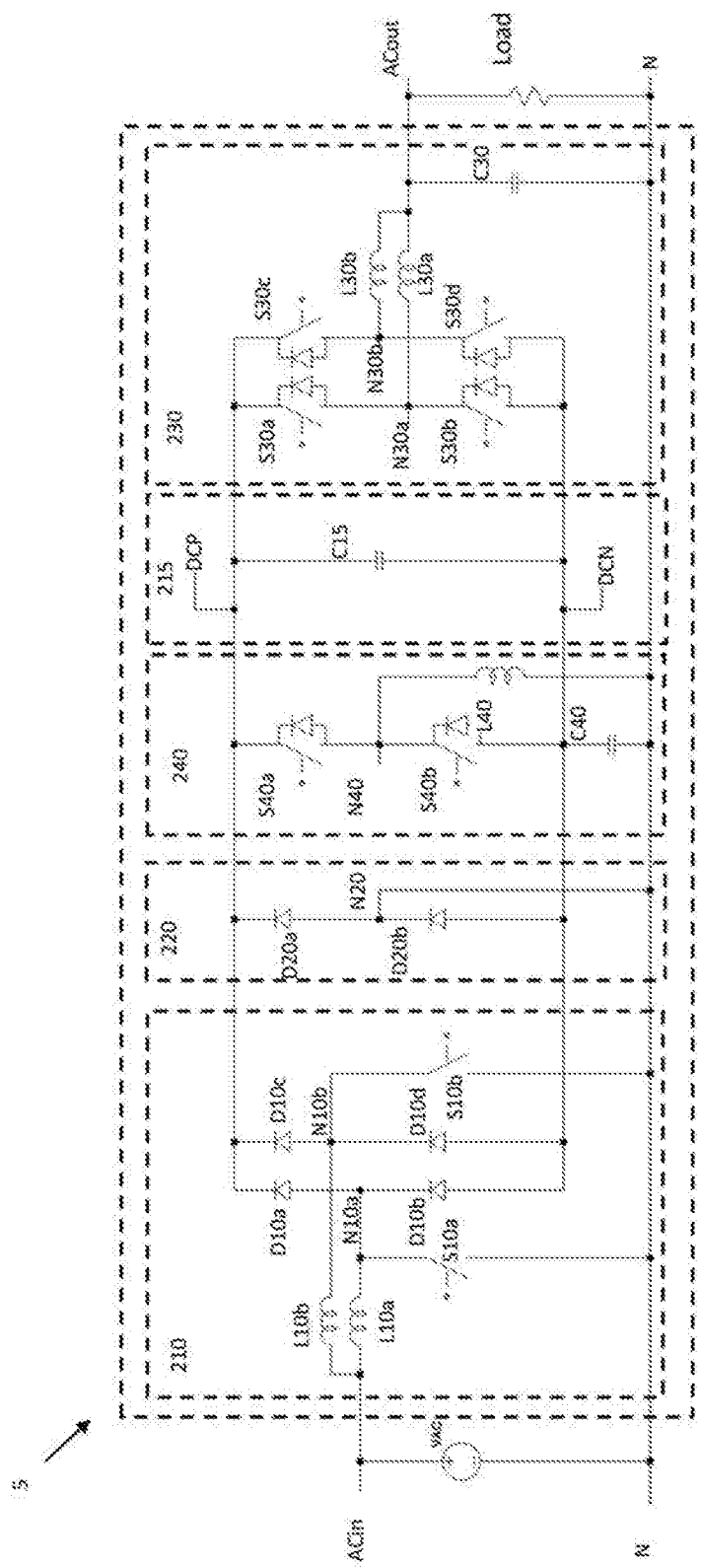
FIG. 14 illustrates an alternative embodiment of FIG. 8, where the AC/DC converter is uni-directional.

An alternative embodiment of the present disclosure will now be described with reference to FIG. 14. Here, the power converter 5 is a uni-directional interleaved type of AC/DC converter.

Here, the energy storage circuit 215, the auxiliary converter circuit 240 and the DC/AC converter circuit 230 are similar to the embodiment of FIG. 8, while the circuits 210 and 220 will be described in detail below.

Here, the AC/DC converter circuit 210 includes a first diode device D10a having its cathode connected the positive DC terminal DCP and its anode connected to a first AC/DC circuit node N10a, a second diode device D10b having its cathode connected to the first AC/DC circuit node N10a and its anode connected to the negative DC terminal DCN, a third diode device D10c having its cathode connected to the positive DC terminal DCP and its anode connected to a second AC/DC circuit node N10b, and a fourth diode device D10d having its cathode connected to the second AC/DC circuit node N10b and its anode connected to the negative DC terminal DCN.

In addition, the AC/DC converter circuit 210 further includes a first input inductor L10a connected between the first AC/DC circuit node N10a and the AC input terminal ACin and a second input inductor L10b connected between the second AC/DC circuit node N10b and the AC input terminal ACin.

In other embodiments, the AC/DC converter circuit 210 may further include a first switching device S10a connected between the first AC/DC circuit node N10a and the neutral terminal N and a second switching device S10b connected between the second AC/DC circuit node N10b and the neutral terminal N.

These switching devices S10a, S10b are bidirectional switching devices and will be described further in detail below.

In the present embodiment, the line frequency commutated neutral circuit 220 includes diodes. Hence, the line frequency commutated neutral circuit 220 here includes a first diode device D20a having its cathode connected to the positive DC terminal DCP and its anode connected to the line frequency commutated neutral circuit node N20 and a second diode device D20b having its cathode connected to the line frequency commutated neutral circuit node N20 and its anode connected to the negative DC terminal DCN. The line frequency commutated neutral circuit node N20 is connected to the neutral terminal N.

Here, power may only be transferred from the ACinput terminal to the battery and/or AC output terminal—power may not be transferred in the opposite direction.

Sixth Embodiment

An alternative embodiment of the present disclosure will now be described with reference to FIG. 15. Here, the power converter 6 may include an interleaved type of AC/DC converter, as in FIG. 8.

Here, the energy storage circuit 215, the auxiliary converter circuit 240 and the line frequency commutated neutral circuit 220 are similar to the embodiment of FIG. 8, while the circuits 210 and 220 will be described in detail below.

Figure 15:
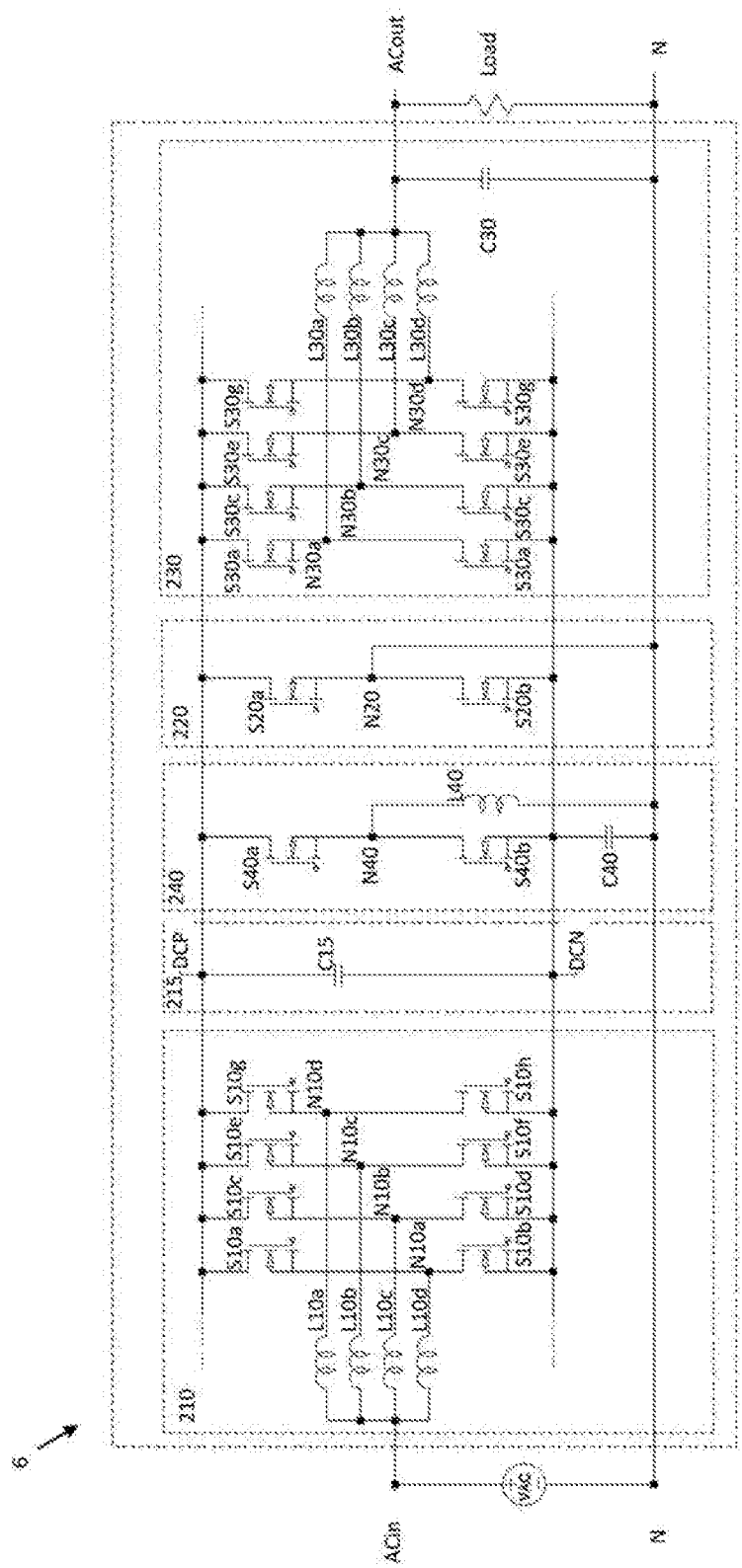
FIG. 15 illustrates yet an alternative embodiment of the invention.

In FIG. 15, it is shown that the AC/DC converter circuit 210 includes eight switching devices S10a-h, where switching devices S10a, S10c, S10e, S10g are connected between the positive DC terminal DCP and respective AC/DC circuit nodes N10a, N10b, N10c, N10d and where switching devices S10b, S10d, S10f, S10h are connected between the respective AC/DC circuit nodes N10a, N10b, N10c, N10d and the negative DC terminal DCN.

In addition, the AC/DC converter circuit 210 includes four input inductors L10a, L10b, L10c, L10d connected between the AC input terminal ACin and the respective AC/DC circuit nodes N10a, N10b, N10c, N10d.

It is further shown in FIG. 15 that the DC/AC converter circuit 230 includes eight switching devices S30a-h, where switching devices S30a, S30c, S30e, S30g are connected between the positive DC terminal DCP and respective DC/AC circuit nodes N30a, N30b, N30c, N30d and where switching devices S30b, S30d, S30f, S30h are connected between the respective DC/AC circuit nodes N30a, N30b, N30c, N30d and the negative DC terminal DCN.

In addition, the DC/AC converter circuit 230 includes four output inductors L30a, L30b, L30c, L30d connected between the AC output terminal ACout and the respective DC/AC circuit nodes N30a, N30b, N30c and N30d.

It should be noted that in yet alternative embodiments, there may be six switching devices or more than eight switching devices in the circuits 210, 230. Of course, the number of nodes and inductors will depend on the number of switching devices. There can also be a different number of switching devices in circuit 210 than in circuit 230.

As in the embodiments above, the switching devices are bi-directional with respect to current and uni-directional with respect to blocking voltage.

The Bidirectional Switching Device BS

The bidirectional switching device mentioned above and shown in the drawings will now be described with reference to FIG. 16a, 16b, 16c. Here, the bidirectional switching devices are denoted as BS. It should be noted that these embodiments of the bidirectional switching device BS are known from WO 2014/114481.

Figure 16A:
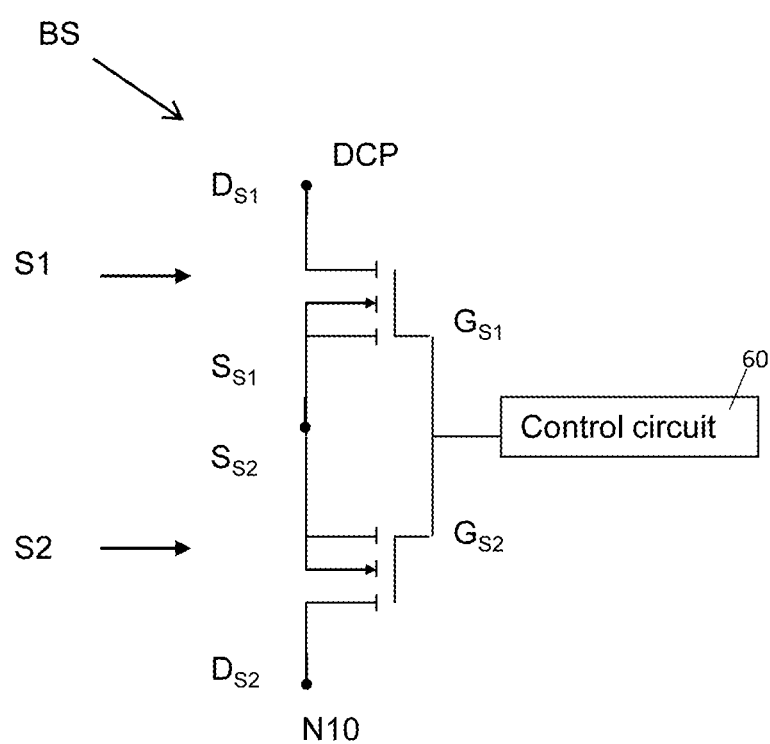
FIGS. 16a, 16b, 16c illustrate different embodiments of the bidirectional switches of the AC/DC converter and the DC/AC converter of FIG. 15.
Figure 16B:
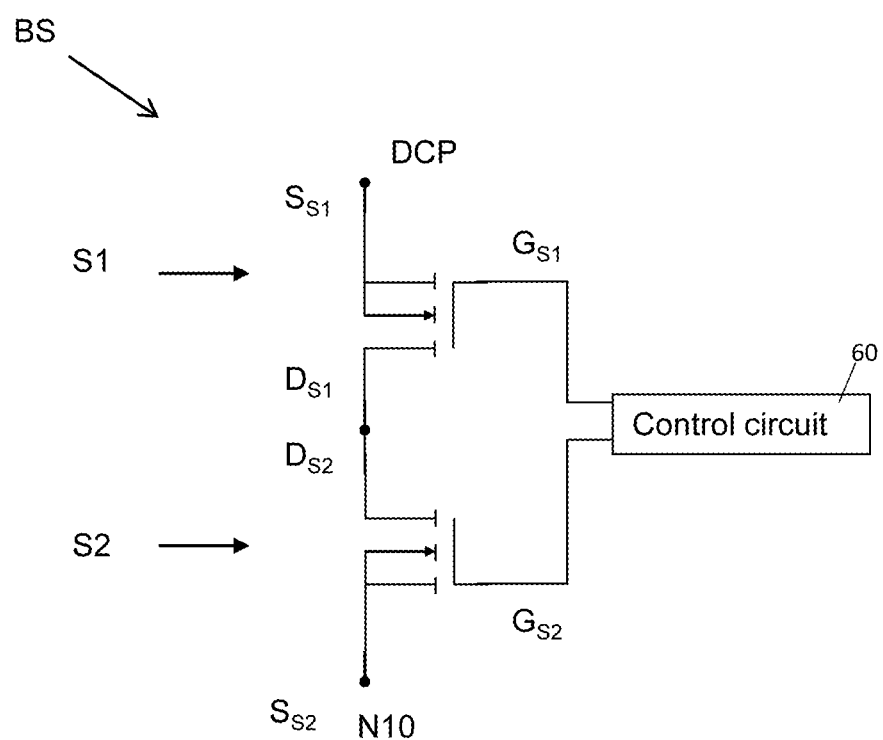
Figure 16C:
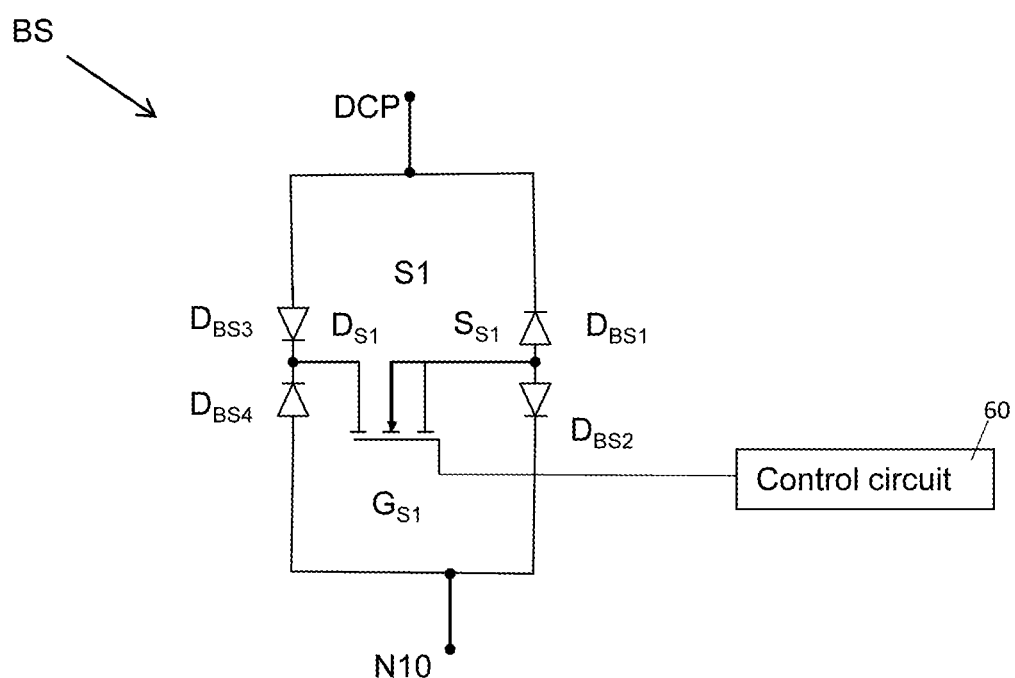

In FIG. 16a-c, the first switching device S10a of the AC/DC converter circuit 210 is shown as an example of a switching device BS, where the switching device BS is connected between the positive DC terminal DCP and the node N10. However, the same switching device BS can be used for all the other switching devices of the power converters 2-6.

In a first embodiment shown in FIG. 16a, the bidirectional switch BS includes a first BS switch S1 and a second BS switch S2, each including control terminals $G_{S1}$, $G_{S2}$ connected to the control circuit 60. A drain terminal $D_{S1}$ of the first BS switch S1 is connected to the positive DC terminal DCP, a drain terminal $D_{S2}$ of the second BS switch S2 is connected to the node N10, and a source terminal $S_{S1}$ of the first BS switch S1 is connected to a source terminal $S_{S2}$ of the second BS switch S2.

In a second embodiment shown in FIG. 16b, the bidirectional switch BS also includes a first BS switch S1 and a second BS switch S2. Here, a source terminal $S_{S1}$ of the first BS switch S1 is connected to the positive DC terminal DCP, a source terminal $S_{S2}$ of the second BS switch S2 is connected to the node N10, and a drain terminal Dsi of the first BS switch S1 is connected to a drain terminal $D_{S2}$ of the second BS switch S2.

In a third embodiment shown in FIG. 16c, the bidirectional switch BS includes a first BS switch S1 and switch diodes $D_{BS1}$, $D_{BS2}$, $D_{BS3}$, $D_{BS4}$. Here, a source terminal $S_{S1}$ of the first BS switch S1 is connected to an anode of a first switch diode $D_{BS1}$ and to an anode of a second switch diode $D_{BS2}$. A drain terminal DS1 of the first BS switch S1 is connected to a cathode of a third switch diode $D_{BS3}$ and to a cathode of a fourth switch diode $D_{BS4}$. A cathode of the first switch diode $D_{BS1}$ and an anode of the third switch diode $D_{BS3}$ is connected to the positive DC terminal DCP. A cathode of the second switch diode $D_{BS2}$ and an anode of the fourth switch diode $D_{BS4}$ is connected to the node N10. A control terminal $G_{S1}$ of the first BS switch S1 is connected to the control circuit.

In the description above, the common switches Sc1, Sc2 and the output switches Sout1, Sout2 are MOSFET switches or IGBT switches with an antiparallel diode. Preferably, the switches are silicon carbide MOSFETs or gallium nitride MOSFETs. In FIG. 16c, also the first BS switch S1 of the bidirectional switch BS is a MOSFET or IGBT. In FIGS. 16a and 16b, also the first and second BS switches S1, S2 of the bidirectional switch BS are MOSFET switches.

Alternative Embodiments

The particular arrangements shown in the Figures should not be viewed as limiting.

It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

Figure 1C:
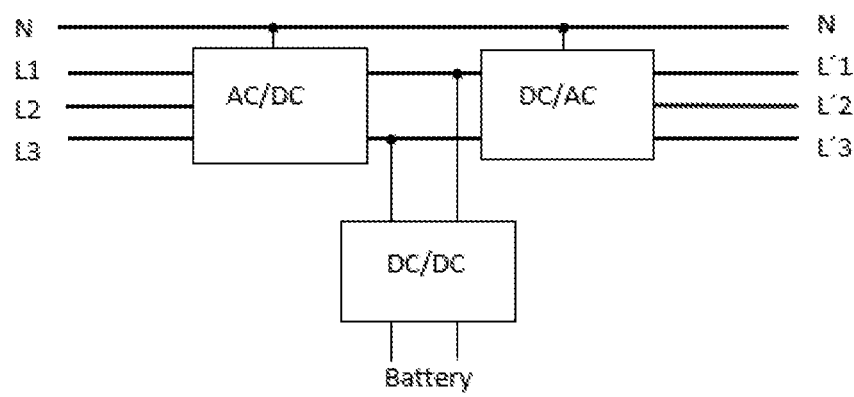
FIG. 1c illustrates a prior art three phase AC-UPS.
Figure 2:
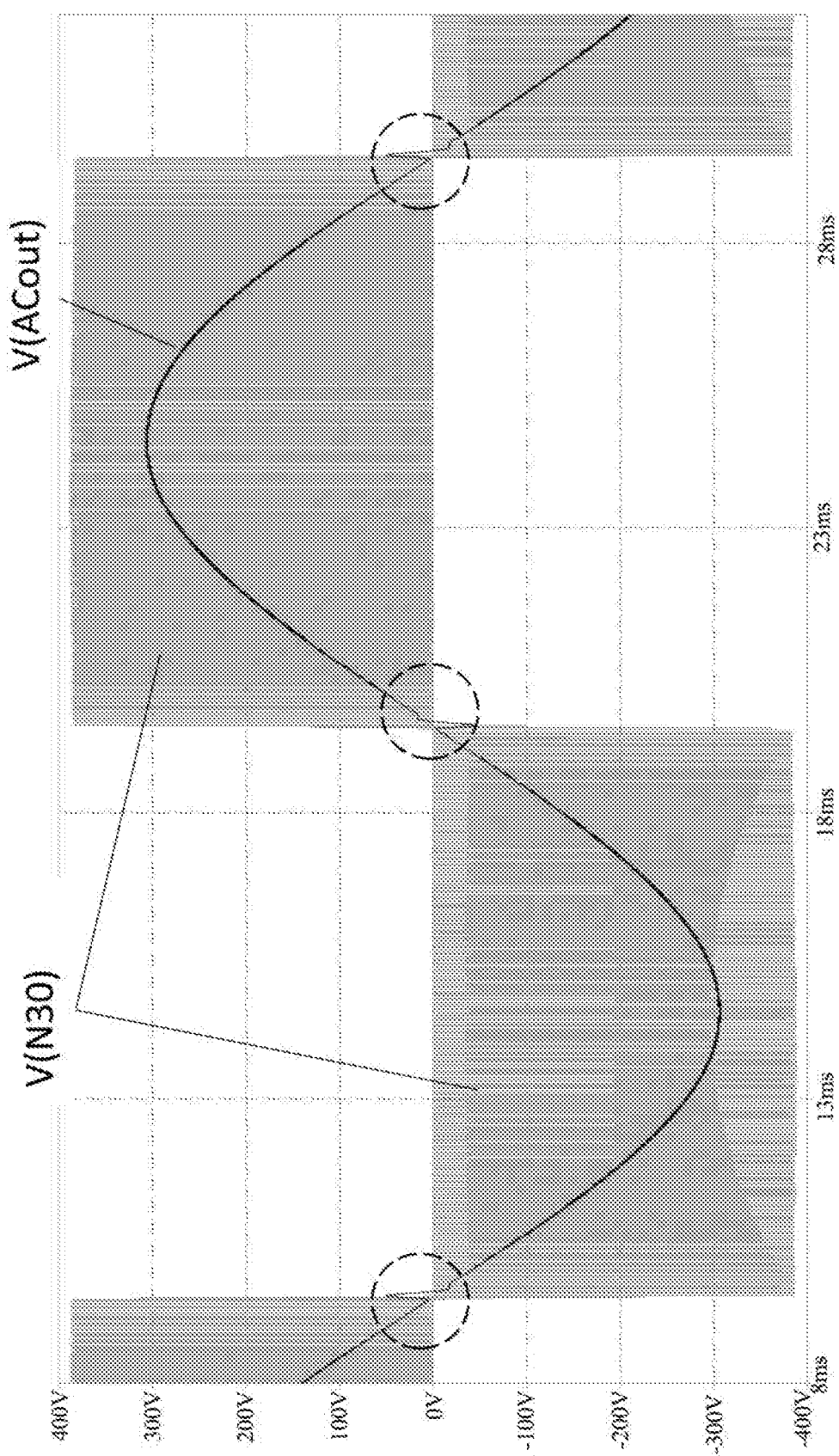
FIG. 2 illustrates the high frequency PWM controlled inverter switch voltage between node N30 and the neutral terminal and the resulting AC output voltage of FIG. 1a-FIG. 1c.

As an example, it is shown a three phase AC-UPS in FIG. 1c. It should be noted that the principle of the AC/AC converter described above also can be used in a three phase AC-UPS with three single phase UPS configured one per phase.

What is claimed is:

1. A power converter, comprising:
an alternating current (AC) input terminal;
a neutral terminal;
an AC output terminal;
an AC/direct current (DC) converter circuit connected between the AC input terminal, a positive DC terminal and a negative DC terminal;
a DC capacitor connected between the positive DC terminal and the negative DC terminal;
a line frequency commutated neutral circuit connected between the positive DC terminal, the negative DC terminal and the neutral terminal; and
a DC/AC converter circuit connected between the positive DC terminal, the negative DC terminal, the AC output terminal and the neutral terminal;

wherein the power converter further comprises an auxiliary converter circuit connected between the positive DC terminal, the negative DC terminal and the neutral terminal;

wherein the auxiliary converter circuit is configured to decouple the AC input terminal and the AC output terminal during a period around zero crossings of an AC line voltage supplied to the AC input terminal and an AC output voltage supplied to the AC output terminal;

wherein the control circuit is configured to control the first auxiliary switch device and the second auxiliary switch device by the steps of:

defining first, second, third, fourth, fifth, and sixth time intervals for an AC line voltage period, wherein zero crossing of the AC line voltage is defined at the start of the first and fourth time intervals;

controlling, by means of the control circuit, the first auxiliary switching devices to perform switching with a first duty cycle and the second auxiliary switching device to perform switching with a second duty cycle during the first, third, fourth and sixth time intervals;

controlling, by means of the control circuit, the first auxiliary switching device and the second auxiliary switching device to be turned off during the second and fifth time intervals;

wherein a sum of the first duty cycle and the second duty cycle is less than or equal to 1.

2. The power converter according to claim 1, wherein the auxiliary converter circuit comprises a first auxiliary switching device and a second auxiliary switching device in a half-bridge configuration.

3. The power converter according to claim 2, wherein the auxiliary converter circuit further comprises an auxiliary capacitor and an auxiliary inductor, wherein:

the first auxiliary switching device is connected between the positive DC terminal and an auxiliary circuit node;

the second auxiliary switching device is connected between the auxiliary circuit node and the negative DC terminal;

the auxiliary capacitor is connected between the negative DC terminal and the neutral terminal; and the auxiliary inductor is connected between the auxiliary circuit node and the neutral terminal.

4. The power converter according to claim 2, wherein the power converter further comprises a control circuit configured to provide control signals to the first auxiliary switching device and the second auxiliary switching device of the auxiliary converter circuit.

5. The power converter according to claim 4, wherein the control signals comprise pulse width modulation signals.

6. The power converter according to claim 1, wherein the period around the zero crossings has a duration of 0.5-3 milliseconds.

7. The power converter according to claim 1, wherein the first, second, third, fourth, fifth and sixth time intervals are consecutive time intervals.

8. The power converter according to claim 1, wherein at least one of the AC/DC converter circuit and/or the DC/AC converter circuit comprises an interleaved type of converter circuit.

9. The power converter according to claim 1, wherein the AC/DC converter circuit comprises:

a first switching device connected between the positive DC terminal and a AC/DC circuit node;

a second switching device connected between the AC/DC circuit node and the negative DC terminal; and an input inductor connected between the AC/DC circuit node and the AC input terminal.

10. The power converter according to claim 1, wherein the AC/DC converter circuit comprises:

a first switching device connected between the positive DC terminal and a first AC/DC circuit node;

a second switching device connected between the first AC/DC circuit node and the negative DC terminal;

a third switching device connected between the positive DC terminal and a second AC/DC circuit node;

a fourth switching device connected between the second AC/DC circuit node and the negative DC terminal;

a first input inductor connected between the first AC/DC circuit node and the AC input terminal; and a second input inductor connected between the second AC/DC circuit node and the AC input terminal.

11. The power converter according to claim 1, wherein the AC/DC converter circuit comprises:

a first diode device connected between the positive DC terminal and a first AC/DC circuit node;

a second diode device connected between the first AC/DC circuit node and the negative DC terminal;

a third diode device connected between the positive DC terminal and a second AC/DC circuit node;

a fourth diode device connected between the second AC/DC circuit node and the negative DC terminal;

a first input inductor connected between the first AC/DC circuit node and the AC input terminal;

a second input inductor connected between the second AC/DC circuit node and the AC input terminal;

a first switching device connected between the first AC/DC circuit node and the neutral terminal;

a second switching device connected between the second AC/DC circuit node and the neutral terminal.

12. The power converter according to claim 1, wherein the DC/AC converter circuit comprises:

a first switching device connected between the positive DC terminal and a DC/AC circuit node;

a second switching device connected between the DC/AC circuit node and the negative DC terminal;

an output inductor connected between the DC/AC circuit node and the AC output terminal; and an output capacitor connected between the AC output terminal and the neutral terminal.

13. The power converter according to claim 1, wherein the DC/AC converter circuit comprises:

a first switching device connected between the positive DC terminal and a first DC/AC circuit node;

a second switching device connected between the first DC/AC circuit node and the negative DC terminal;

a third switching device connected between the positive DC terminal and a second DC/AC circuit node;

a fourth switching device connected between the second DC/AC circuit node and the negative DC terminal;

a first output inductor connected between the first DC/AC circuit node and the AC output terminal;

a second output inductor connected between the second DC/AC circuit node and the AC output terminal;

an output capacitor connected between the AC output terminal and the neutral terminal.

14. The power converter according to claim 1, wherein the power converter further comprises a surge protection circuit comprising:

a first diode having an anode connected to the AC input terminal and a cathode connected to the positive DC terminal;

a second diode having an anode connected to the negative DC terminal and a cathode connected to the AC input terminal and to the neutral terminal.

15. The power converter according to claim 1, wherein the line frequency commutated neutral circuit comprises a first switching device and a second switching device in a half-bridge configuration.

16. The power converter according to claim 15, wherein the first switching device of the line frequency commutated neutral circuit is connected between the positive DC terminal and a line frequency commutated neutral circuit node, the second switching device of the line frequency commutated neutral circuit is connected between the line frequency commutated neutral circuit node and the negative DC terminal, and the line frequency commutated neutral circuit node is connected to the neutral terminal.

17. A method for controlling a power converter, comprising:
   an alternating current (AC) input terminal;
   a neutral terminal;
   an AC output terminal;
   a positive direct current (DC) terminal;
   a negative DC terminal;
   an AC/DC converter circuit connected between the AC input terminal, the positive DC terminal and the negative DC terminal;
   a line frequency commutated neutral circuit connected between the positive DC terminal, the negative DC terminal and the neutral terminal;
   a DC/AC converter circuit connected between the positive DC terminal, the negative DC terminal, the AC output terminal, and the neutral terminal;
   an auxiliary converter circuit comprising a first switching device and a second switching device in a half-bridge configuration and connected between the positive DC terminal, the negative DC terminal, and the neutral terminal; and
   a control circuit electrically coupled with the first switching device and the second switching device of the auxiliary converter circuit; wherein the method comprises the steps of:
   defining first, second, third, fourth, fifth and sixth time intervals for an AC line voltage period, wherein zero crossing of the AC line voltage is defined at the start of the first and fourth time intervals;
   controlling, by means of the control circuit, the first auxiliary switching device to perform switching with a first duty cycle and the second auxiliary switching device to perform switching with a second duty cycle during the first, third, fourth and sixth time intervals;
   controlling, by means of the control circuit, the first auxiliary switching device and the second auxiliary switching device to be turned off during the second and fifth time intervals;
   wherein a sum of the first duty cycle and the second duty cycle is less than or equal to 1.

18. The method according to claim 17, wherein the line frequency commutated neutral circuit comprises a first switching device and a second switching device in a half-bridge configuration, and the method further comprises the steps of:
   controlling, by means of the control circuit, the first switching device and the second switching device of the line frequency commutated neutral circuit to be turned off during the first, third, fourth and sixth time intervals;
   controlling, by means of the control circuit, the first switching device and the second switching device of the line frequency commutated neutral circuit to perform switching during the second and fifth time intervals.

* * * * *